US009465484B1

(12) United States Patent
Kamarshi et al.

(10) Patent No.: US 9,465,484 B1
(45) Date of Patent: Oct. 11, 2016

(54) FORWARD AND BACKWARD LOOKING VISION SYSTEM

(71) Applicant: Amazon Technologies, Inc., Seattle, WA (US)

(72) Inventors: Vijay Kamarshi, Cupertino, CA (US); Qiang Liu, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 43 days.

(21) Appl. No.: 13/793,276

(22) Filed: Mar. 11, 2013

(51) Int. Cl.
*G06F 3/042* (2006.01)

(52) U.S. Cl.
CPC ..................................... *G06F 3/042* (2013.01)

(58) Field of Classification Search
CPC .... G06F 3/0421; G06F 3/0412; G06F 3/042; G06T 2207/10016; G06T 7/2033; G06K 9/3241; G03B 41/08; G03B 35/18; G03B 41/04; G03B 21/40
USPC ................... 345/173–184; 178/18.01–30.04; 352/114–115
See application file for complete search history.

(56) References Cited

U.S. PATENT DOCUMENTS

| 7,418,392 | B1 | 8/2008 | Mozer et al. | |
|---|---|---|---|---|
| 7,436,556 | B2 * | 10/2008 | Onishi | H04N 1/02855 358/475 |
| 7,499,027 | B2 * | 3/2009 | Brigham, II | G06F 3/03542 345/158 |
| 7,589,715 | B2 * | 9/2009 | Tanaka | G06F 3/03545 345/174 |
| 7,653,213 | B2 * | 1/2010 | Longhurst | G01S 3/7865 345/418 |
| 7,720,683 | B1 | 5/2010 | Vermeulen et al. | |
| 7,774,204 | B2 | 8/2010 | Mozer et al. | |
| 7,961,909 | B2 * | 6/2011 | Mandella | G01B 21/04 178/18.01 |
| 8,651,666 | B2 * | 2/2014 | Huebner | G03B 21/14 353/28 |
| 2004/0102247 | A1 * | 5/2004 | Smoot | A63F 13/00 463/36 |
| 2005/0185825 | A1 * | 8/2005 | Hoshino | H04N 5/265 382/103 |
| 2008/0024463 | A1 * | 1/2008 | Pryor | B60K 35/00 345/175 |
| 2008/0266266 | A1 * | 10/2008 | Kent | G06F 3/0436 345/173 |
| 2009/0091710 | A1 * | 4/2009 | Huebner | G03B 21/14 353/28 |
| 2010/0138797 | A1 * | 6/2010 | Thorn | G06F 3/017 715/863 |
| 2011/0256927 | A1 * | 10/2011 | Davis | A63F 13/10 463/34 |
| 2012/0075256 | A1 * | 3/2012 | Izadi | G06F 3/0421 345/175 |

(Continued)

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

*Primary Examiner* — Kumar Patel
*Assistant Examiner* — Vinh Lam
(74) *Attorney, Agent, or Firm* — Lee & Hayes, PLLC

(57) ABSTRACT

A vision system associated with a projection system includes multiple optical pathways. For instance, when the projection system projects an image onto a generally vertical surface, the vision system may operate in a rear sensing mode, such as for detecting one or more gestures made by a user located behind the projection system. Alternatively, when the projection system projects the image onto a generally horizontal surface the vision system may operate in a front sensing mode for detecting gestures made by a user located in front of the projection system. One or more thresholds may be established for switching between the front sensing mode and the rear sensing mode based on orientation information. As another example, the vision system may be operated in both the front sensing mode and the rear sensing mode contemporaneously.

26 Claims, 11 Drawing Sheets

(56) References Cited

U.S. PATENT DOCUMENTS

| | | | |
|---|---|---|---|
| 2012/0169673 A1* | 7/2012 | Wilson | G06F 3/0421 345/175 |
| 2012/0182266 A1* | 7/2012 | Han | G06F 3/0425 345/175 |
| 2012/0223885 A1 | 9/2012 | Perez | |
| 2012/0242955 A1* | 9/2012 | Yoshino | A61B 3/152 351/208 |
| 2012/0280941 A1* | 11/2012 | Hu | G03B 33/12 345/175 |
| 2013/0016071 A1* | 1/2013 | Geaghan | G06F 3/042 345/175 |
| 2013/0082978 A1* | 4/2013 | Horvitz | G06F 3/017 345/175 |
| 2013/0142383 A1* | 6/2013 | Viswanathan | G06F 1/1684 382/103 |
| 2013/0162521 A1* | 6/2013 | Lee | H04N 9/3194 345/156 |
| 2013/0342493 A1* | 12/2013 | Crow | G06F 3/0425 345/174 |
| 2014/0009443 A1* | 1/2014 | Hung | G06F 3/0425 345/175 |
| 2014/0111478 A1* | 4/2014 | Lin | G06F 3/03547 345/175 |
| 2014/0240293 A1* | 8/2014 | McCaughan | G06F 3/0304 345/175 |
| 2014/0293033 A1* | 10/2014 | Takii | A61B 3/12 348/78 |

* cited by examiner

FORWARD AND BACKWARD LOOKING VISION SYSTEM

BACKGROUND

A projection system may project an image onto a projection display screen or other passive projection display surface. For instance, the images may be projected from the front side of a display surface (i.e., the side facing the viewing audience) or from the rear side (i.e., the side hidden from the viewing audience). With front projection systems, one of the challenges that may impact viewing quality is the physical arrangement of the screen within an environment, relative to the projector, and relative to the viewer(s). Ideally, for a conventional screen, the projector should project the image from a location that is perpendicular to a planar surface of the screen. The viewer should also have a point of view that is normal to the planer surface. However, if a portion of the viewer's body is located between the projector and the display surface, the viewer's body may block at least a portion of the projected image.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
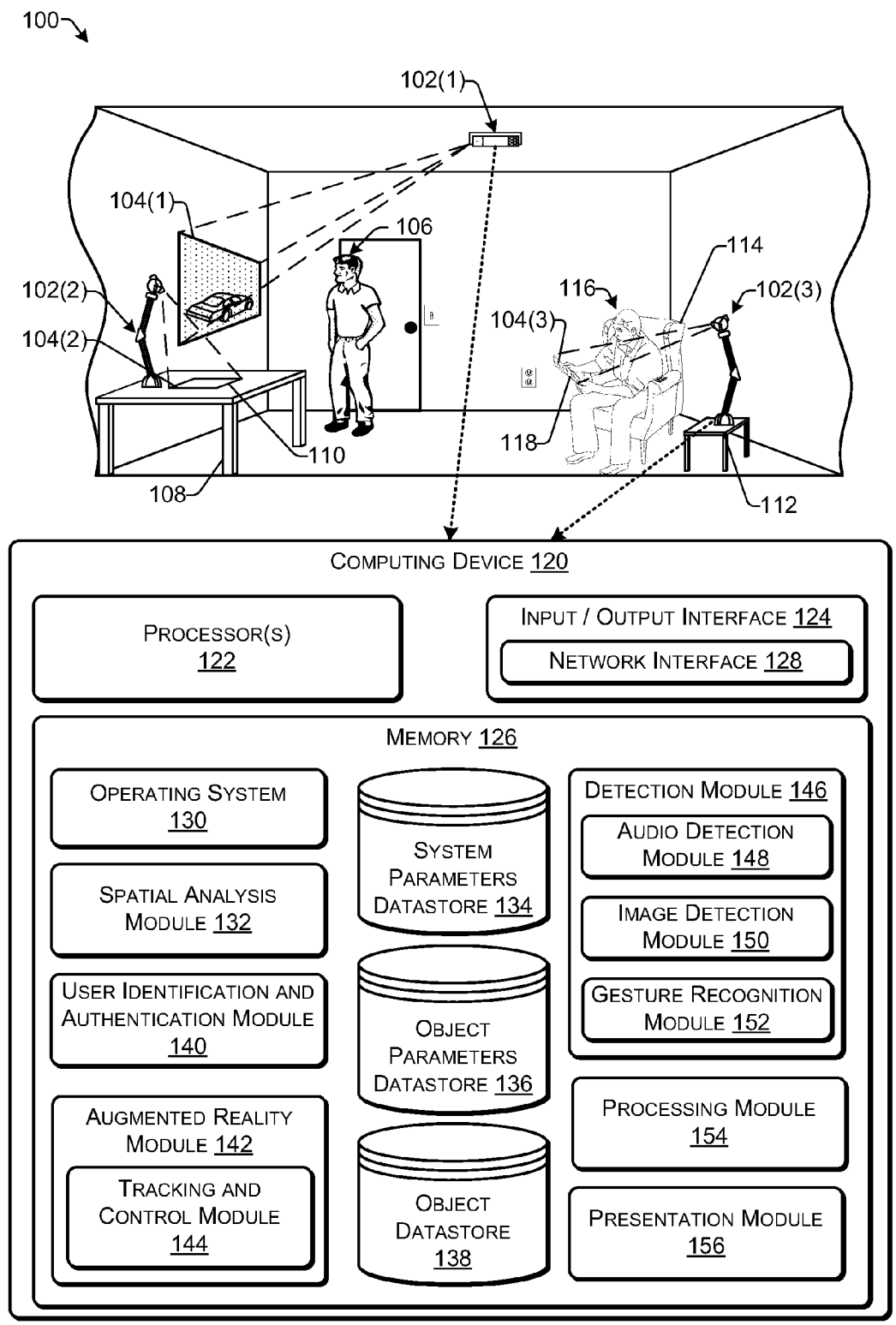
FIG. 1 illustrates an example environmental area, such as a room, in which some implementations of the projection techniques and arrangements described herein may be employed.

This disclosure describes techniques and arrangements for controlling a vision system. Some examples herein include projecting an image onto a display surface and using the vision system to detect user gestures, such as for interacting with the image. For instance, a projector, an augmented reality system, or other type of projection system may project a visible light image onto a horizontal display surface, onto a vertical display surface, or onto a display surface having some other orientation. The projection system may also be configured to emit non-visible light, such as infrared (IR) light, ultraviolet (UV) light, or the like. The non-visible light may be used to illuminate a region and to reflect off any objects in that region. The reflected non-visible light can be captured by the projection system to detect human movement, gestures, and/or expressions. Such gestures may be used in the navigation and/or operation of the projection system and an associated computing device. For instance, the non-visible light may be projected from the projection system, reflected off of a user's hand, and sensed by a light sensor in the projection system to provide gesture recognition. As one example, the gesture recognition may enable interaction with a graphic user interface projected onto the display surface.

In some implementations, a user interacts with a projection system that includes a combined vision system and projection apparatus. For example, the projection system may project an image onto a horizontal surface, such as a table, or onto a vertical surface, such as a wall or screen. In the table example, the projector projects an image onto the table surface, and the vision system may use the same optical path as the projector for detecting gestures made by the user. Accordingly, the vision system may operate in a front sensing mode when an image is projected onto a horizontal surface. On the other hand, when the projector projects an image onto a wall or other vertical surface, the vision system may operate in a rear sensing mode for sensing gestures made by a user behind the projector, rather than in front of the projector. In some cases, the vision system may automatically switch between the front sensing mode and the rear sensing mode based on orientation information relating to an orientation of the projector or and/or an orientation of the display surface.

As one example, the vision system may include an infrared (IR) emitter, such as IR LEDs (light emitting diodes) or an IR laser, such as a laser diode, that project infrared energy to the same general area as the projected image. The IR light is reflected back to an IR sensor included with the projection system. In some examples, the IR sensor may be included in a visible light camera, while in other examples, the IR sensor may be a designated IR sensor. A computing device associated with the projection system may use the reflected IR light to establish a depth map of the field of view of the IR sensor, and identify any detected gestures using the depth map. Accordingly, the user is able to interact with the projected image using gestures that are recognized by the vision system.

In some examples, the projection system may be positioned to project an image toward a vertical surface such as a wall or display screen. However, it is typically not practical for the user to stand next to the wall to interact with the system. For example, the user's head, shoulders, and body may block or otherwise interfere with the projected image. Further, some gestures may be blocked by the user's body, and not detectable by the vision system. Accordingly, implementations herein enable a rear sensing mode of interaction in which the user may be positioned behind or adjacent to the projection system for interacting with the projected image. For instance, the interaction region may be an imaginary region in space that is a proxy for the projection surface. Thus, the vision system may include a second vision pathway that emits non-visible light in a direction away from the projection direction. For example, the second vision pathway may be in a direction opposite to the direction of the first vision pathway that is optically aligned with the direction of projection of the image.

As one example, the first and second vision pathways may be mutually exclusive such that the front sensing vision pathway is active when the projection system is projecting onto a horizontal surface, such a table. Furthermore, when the axis of projection is directed toward a vertical surface, such as a wall, the rear sensing vision pathway may become active and the front sensing vision pathway may be made inactive. For example, the projection system may include an accelerometer, potentiometer, or other orientation sensor that detects whether the projector is directed toward a horizontal surface or a vertical surface. Alternatively, as another example, the projection system may detect a distance to the projection surface or a size of the projected image and may determine whether to use the front sensing or rear sensing vision system based on the determined distance or image size. As still another example, the projection system may automatically detect an orientation of the projection surface and may determine whether to use the front sensing or rear sensing vision system based on one or more thresholds such as an orientation threshold of the projector or the projection display surface. In still other examples, the first and second vision pathways are not mutually exclusive, but instead may operate contemporaneously for detecting gestures from both the front and the rear of the vision system.

The projection system may include a gesture recognition module that is executed on the computing device to allow a user to interact with projected images, such as graphic interfaces. The vision system field of view (FoV) may be collinear with the projection direction when the projector is aimed toward a horizontal surface. Alternatively, when the projector is aimed toward a vertical surface, the vision system field of view may be directed in a direction opposite to, at an angle to, or otherwise away from the projection direction. The vision system may receive reflected non-visible light to form depth maps that can be used by the gesture recognition module to recognize gestures, such as may be made by the hands and fingers of a user. Furthermore, in some examples, the two vision pathways may both use the same light sensor, such as an IR sensor, for forming depth maps. Since the two vision optical paths may operate mutually exclusively, they may share the same light sensor for receiving the reflected non-visible light. Alternatively, of course, each vision system may include its own light sensor, such as an IR detector, or the like.

In addition, in some implementations, the projection system may include at least one visible light camera, e.g., an RGB (red, green, blue) camera, that is operable to capture images from the front side when projecting onto a horizontal surface and that automatically converts to capturing images from the rear side when projecting onto a vertical surface. For example, images from the RGB camera may be used for recognizing gestures, objects, and user faces, may be used for videoconferencing, and so forth.

The projection systems described herein may be employed in a variety of environments such as conference rooms, classrooms, homes, offices, commercial environments, retail environments, and so forth. Typical projection systems may include a projector configured to emit light focused toward a projection display surface. The display surface in turn is configured to reflect and scatter the projected light so that the projected image is presented to one or more users. The display surface may be fixed, such as in the case of a display surface that mounts to a wall, table or stand. Alternatively, or additionally, the display surface may be portable and freely repositionable, such as a handheld projection display screen.

In some examples, the projection systems herein may be used in augmented reality environments that include systems of resources such as cameras, projectors, vision systems, range finders, computing devices with processing and memory capabilities, and so forth, which may perform the processes described herein. The projectors may project images onto the surroundings that define the environment or may cause various operations to be performed within the environment. Moreover, cameras and microphones may monitor and capture user interactions with devices and objects, and these inputs may be used, in part, to determine one or more images to present to particular users.

Some implementations may include an augmented reality functional node (ARFN) that is configured to dynamically accommodate motion and tilt in three-dimensional space. For example, a projector of the ARFN projects light onto a fixed or mobile projection display surface. In some cases, the display surface may be handheld and may change in one or both of its distance from the projector or its angle with respect to an optical axis between the projector and the display surface. In response to detecting a change in distance or angle of the display surface, the ARFN may dynamically perform a sequence of actions to accommodate the change.

The systems and techniques described herein may be implemented in many different manners. Several illustrative examples are described below in which the projection system is implemented as part of an augmented reality environment within a room. However, the projection system may be implemented in many other contexts and situations in which images are projected onto screens for viewing consumption.

FIG. 1 depicts an example environment 100 in which a projection system may be used. The environment 100 may include one or more projectors. In the illustrated example, at least one projector is included in an ARFN (augmented reality functional node) 102. However, in other examples, the projector is not associated with an ARFN, but may instead be a stand-alone projector or a projector associated with a different type of projection system, display system, media system, computer system, gaming system, theater system, videoconferencing system or the like. For example, the projectors, vision systems and the display surfaces herein may be associated with any type of computing device, home electronics, consumer electronics, automotive electronics, commercial electronics, and so forth.

In FIG. 1, the environment 100 includes three ARFN 102(1)-(3) shown within the room. Each ARFN 102 contains projectors, cameras, vision systems and computing resources that are used to generate the augmented reality environment 100. In this illustration, the first ARFN 102(1)

is a fixed mount system that may be mounted within the room, such as mounted to the ceiling, although other placements are contemplated. The first ARFN 102(1) projects images onto the scene, such as onto a display surface 104(1) on a wall of the room. A first user 106 may watch and interact with the images projected onto the wall, and the ceiling-mounted ARFN 102(1) may capture that interaction. In addition, the ARFN 102(1) may detect a location of the user or actions taken by the user within the room (e.g., gestures) or sounds output by the user. In response, the ARFN 102(1) may identify operations associated with those locations, gestures or sounds and cause those operations to be performed within the room. The ARFN 102(1) may further include one or more devices, such a camera, range finder, or the like, such as to detect a distant to the projected image and/or orientation of the display surface. One implementation of the first ARFN 102(1) is provided below in more detail with reference to FIG. 2.

A second ARFN 102(2) may be embodied to resemble a table lamp, which is shown sitting on a horizontal surface of a desk or table 108 in the example of FIG. 1. The second ARFN 102(2) projects one or more images 110 onto a display surface 104(2) of the desk 108, and the user 106 may view and interact with the projected image 110. The projected image 110 may be of any number of things, such as homework, video games, news, movies, television shows, recipes, a graphic interface, and so forth.

A third ARFN 102(3) is also embodied to resemble a table lamp, shown sitting on a small table 112 next to a chair 114. A second user 116 is seated in the chair 114, holding a user device 118. The third ARFN 102(3) projects an image onto a display surface 104(3) of the user device 118 for the user 116 to consume and interact with the projected image. The projected images may be of any number of things, such as books, games (e.g., crosswords, Sudoku, etc.), news, magazines, movies, television shows, a browser, a graphic interface, etc. The user device 118 may be essentially any device for use within an augmented reality environment, and may be provided in several form factors. The user device 118 may range from an entirely passive, non-electronic, mechanical surface to a fully functioning, fully processing, electronic device with a projection display surface. For instance, the user device 118 may be a display surface or display medium that includes one or more features with which the user may interact.

Associated with each ARFN 102(1)-(3), or with a plurality of ARFNs 102, is a computing device 120, which may be located within the augmented reality environment 100 or disposed at another location external to the environment 100. Each ARFN 102 may be connected to the computing device 120 via a wired network, a wireless network, or a combination of the two. The computing device 120 has a processor 122, an input/output interface 124 and a memory 126. The processor 122 may include one or more processors configured to execute instructions. The instructions may be stored in memory 126, or in other memory accessible to the processor 122, such as storage in cloud-based resources.

The input/output interface 124 may be configured to couple the computing device 120 to other components, such as projectors, cameras, microphones, other ARFNs, other computing devices, and so forth. The input/output interface 124 may further include a network interface 128 that facilitates connection to a remote computing system, such as cloud computing resources. The network interface 128 enables access to one or more network types, including wired and wireless networks. More generally, the coupling between the computing device 120 and any components may be via wired technologies (e.g., wires, fiber optic cable, etc.), wireless technologies (e.g., RF, cellular, satellite, Bluetooth®, etc.), or other connection technologies.

The memory 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium that can be used to store the desired information and which can be accessed by a computing device.

Several modules such as instructions, datastores, and so forth may be stored within the memory 126 and configured to execute on a processor, such as the processor 122. An operating system module 130 is configured to manage hardware and services within and coupled to the computing device 120 for the benefit of other modules. In some examples, the operating system module 130 may present a graphic user interface to enable a user to interact with the ARFN(s) 102 and/or displayed content.

A spatial analysis module 132 is configured to perform several functions, which may include analyzing a scene to generate a topology, recognizing objects in the scene, dimensioning the objects, and creating a three-dimensional (3D) model or depth map of the scene. Characterization may be facilitated using several technologies including structured light, light detection and ranging (LIDAR), optical time-of-flight, ultrasonic ranging, stereoscopic imaging, radar, and so forth, either alone or in combination with one another. For convenience, and not by way of limitation, some of the examples in this disclosure refer to structured light, which may include non-visible (e.g., IR) structured light. Further, in other examples, the light is not structured light. The spatial analysis module 132 employs the information obtained within the augmented reality environment to provide an interface between the physicality of the scene and virtual objects and information. Accordingly, in some examples, the spatial analysis module may receive an input from the vision system pertaining to received non-visible light. The spatial analysis module 132 may distinguish gestures, control inputs, and the like from other information in the received non-visible light for enabling gesture recognition.

A system parameters datastore 134 is configured to maintain information about the state of the computing device 120, the input/output devices of the ARFN 102, and so forth. For example, system parameters may include current pan and tilt settings of the cameras and projectors, an orientation of a projector toward a display surface, distances from the projector to the display surface, and so forth. As used in this disclosure, the datastore includes lists, arrays, databases, and other data structures used to provide storage and retrieval of data.

An object parameters datastore 136 in the memory 126 is configured to maintain information about the state of objects within the scene. The object parameters may include the surface contour of the object, overall reflectivity, color, and so forth. This information may be acquired from the ARFN 102, other input devices, or via manual input and stored within the object parameters datastore 136.

An object datastore 138 is configured to maintain a library of pre-loaded reference objects. This information may include assumptions about the object, dimensions, and so forth. For example, the object datastore 138 may include a reference object of a beverage can and include the assumptions that beverage cans are either held by a user or sit on a surface, and are not present on walls or ceilings. The spatial analysis module 132 may use this data maintained in the datastore 138 to test dimensional assumptions when determining the dimensions of objects within the scene. In some implementations, the object parameters in the object parameters datastore 136 may be incorporated into the object datastore 138. For example, objects in the scene that are temporally persistent, such as walls, a particular table, particular users, and so forth may be stored within the object datastore 138. The object datastore 138 may be stored on one or more of the memory of the ARFN, storage devices accessible on the local network, or cloud storage accessible via a wide area network.

In addition, the object datastore 138 may maintain a library of sounds or particular frequencies that are associated with different operations that may be performed within the environment. As a result, upon one of the ARFNs 102 detecting a particular sound or frequency within the environment, the ARFN may identify a corresponding operation (e.g., adjust volume, project an image to a particular display surface, etc.) and then cause that operation to be performed.

A user identification and authentication module 140 is stored in memory 126 and executed on the processor(s) 122 to use one or more techniques to verify users within the environment 100. In one implementation, the ARFN 102 may capture an image of the user's face and the spatial analysis module 132 reconstructs 3D representations of the user's face. Rather than 3D representations, other biometric profiles may be computed, such as a face profile that includes key biometric parameters such as distance between eyes, location of nose relative to eyes, etc. In such profiles, less data is used than full reconstructed 3D images. The user identification and authentication module 140 can then match the reconstructed images (or other biometric parameters) against a database of images (or parameters), which may be stored locally or remotely on a storage system or in the cloud, for purposes of authenticating the user. If a match is detected, the user is permitted to interact with the system.

An augmented reality module 142 is configured to generate augmented reality output in concert with the physical environment. In some examples, the augmented reality module 142 may employ essentially any surface, object, or device within the environment 100 to interact with the users. The augmented reality module 142 may be used to track items within the environment that were previously identified by the spatial analysis module 132. The augmented reality module 142 includes a tracking and control module 144 configured to track one or more items within the scene and accept inputs from or relating to the items. In some examples, as discussed additionally below, based on input from one or more sensors, cameras, or the like, the tracking and control module 144 may track the position of a user relative to the ARFN 102 for determining whether to detect gestures from in front of or from behind the ARFN 102. For example, when the ARFN 102 determines that the user is in front of the ARFN 102, the ARFN 102 may emit non-visible light toward the front for detecting user gestures. On the other hand, when the ARFN 102 determines that the user is behind the ARFN 102, the ARFN 102 may emit non-visible light toward the rear for detecting user gestures.

In addition, and as stated above, the memory 126 may maintain, or may be otherwise associated with, a detection module 146. As shown, the detection module 146 may include an audio detection module 148, an image detection module 150 and a gesture recognition module 152. In various implementations, a user 106 may interact with the environment for the purpose of causing one or more operations to be performed within the environment. For example, the audio detection module 148 may detect (e.g., via a microphone) sounds or voice commands. Further, the image detection module 150 may detect one or more objects, faces, or the like, such as based on input from the spatial analysis module 132 and/or one or more vision system detectors, cameras or other sensors.

In addition, the gesture recognition module 152 may recognize one or more actions or gestures performed by the user 106, such as based on input from the spatial analysis module 132 and/or one or more vision system detectors, such as IR sensors, cameras or other sensors. The gesture recognition module 152 uses various capabilities of the ARFN 102 to detect and recognize gestures or other actions made by the user in the environment 100. The gesture recognition module 152 may process the IR light data and/or perform various types of image processing, including three-dimensional (3D) environment analysis, to detect gestures. The gesture recognition module 152 may further analyze gestures to identify multiple possible candidate gestures, and then determine a most statistically probable gesture within the context of the gesture, such as based on content currently displayed on a display surface with which the user is interacting. Data indicative of detected gestures may be compared to stored gesture data in datastore 134 to identify the candidate gestures. When a statistically likely gesture is identified, the operation associated with the gesture is executed.

Upon detecting a particular action, gesture or other output by a user, a processing module 154 may determine one or more operations that are associated with the detected user output. In particular, the ARFN 102 may maintain or be associated with a database that maps various sounds, frequencies, gestures and/or user actions to particular operations that may be performed within the environment. That is, in response to the user 106 performing some action or gesture, the processing module 154 may identify a specific operation. If a desired display surface 104 for receiving a projected image has been identified by the processing module 154, a presentation module 156 may cause projection of a particular image or images onto the display surface. Accordingly, the presentation module 156 may cause an image to be projected, which may be caused by a user interacting with the environment.

Figure 2:
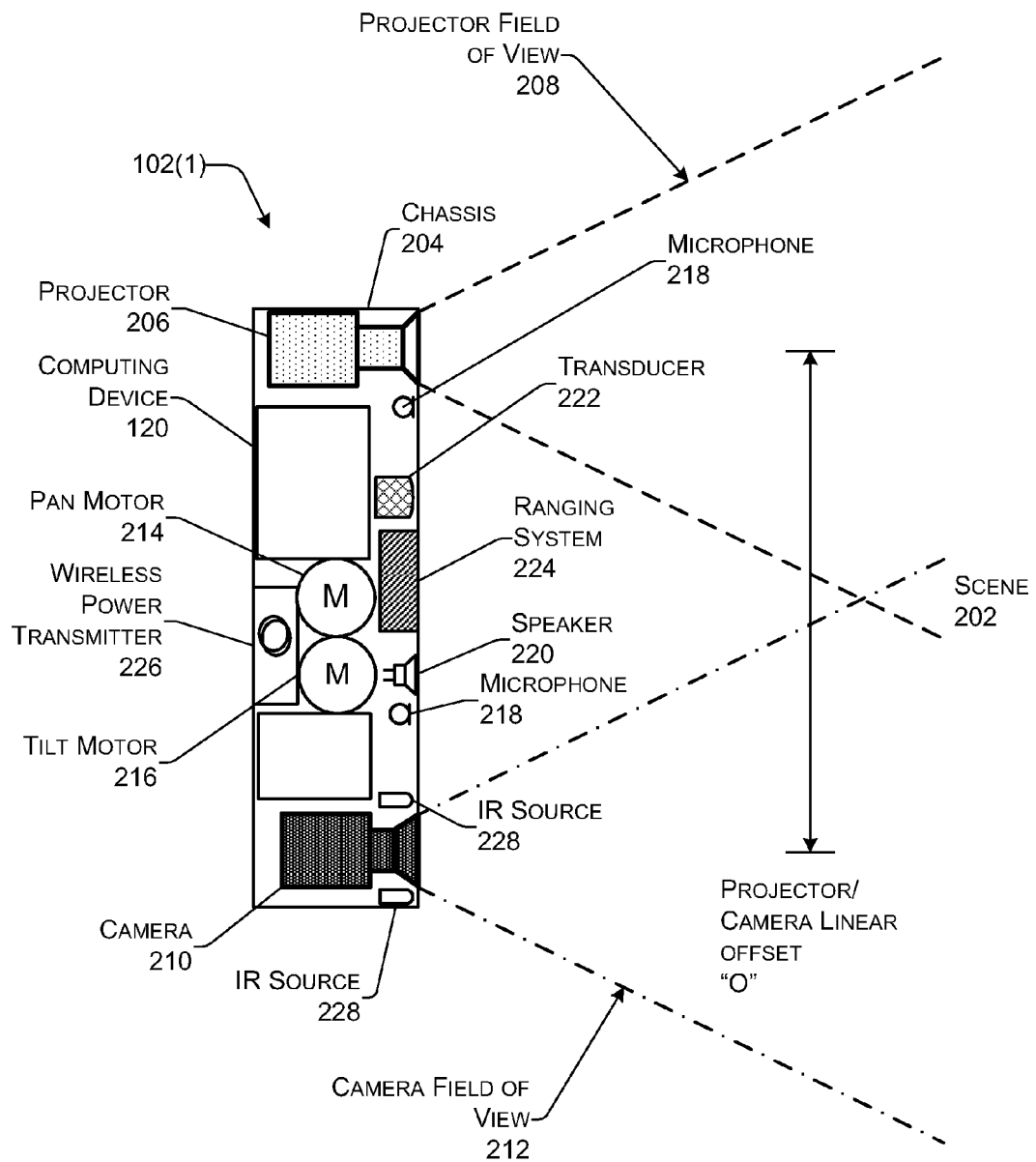
FIG. 2 illustrates an implementation of a projection and image capturing system including a projector and a camera in spaced relation to one another. In this implementation, the projector and the camera have different optical paths.

FIG. 2 shows an illustrative schematic 200 of the first augmented reality functional node 102(1) and selected components. The first ARFN 102(1) is configured to scan at least a portion of a scene 202 and the objects therein. The ARFN 102(1) may also be configured to provide augmented reality output, such as images, sounds, and so forth.

A chassis 204 holds the components of the ARFN 102(1). Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display (LCD), 3LCD, and so forth. The projector 206 has a projector field of view 208 that describes a particular solid angle. The projector field of view 208 may vary according to changes in the configuration of the projector. For example, the projector field of view 208 may narrow upon application of an optical zoom to the projector. In some implementations, a plurality of projectors 206 may be used. Further, in some implementations, the projector 206 may be further configured to project patterns, such as non-visible infrared patterns, that can be detected by camera(s) 210 and used for 3D reconstruction and modeling of the environment. The projector 206 may comprise a microlaser projector, a digital light projector (DLP), cathode ray tube (CRT) projector, liquid crystal display (LCD) projector, light emitting diode (LED) projector or the like.

A camera 210 may also be disposed within the chassis 204. The camera 210 is configured to image the scene in visible light wavelengths, non-visible light wavelengths, or both. The camera 210 may be implemented in several ways. In some instances, the camera 210 may be embodied as a red, green, blue (RGB) camera 210. In other instances, the camera 210 may include time of flight (ToF) sensors. In still other instances, the camera 210 may be a red, green, blue, z-depth (RGBZ) camera 210 that includes both IR and RGB sensors. The camera 210 has a camera field of view 212, which describes a particular solid angle. The camera field of view 212 may vary according to changes in the configuration of the camera 210. For example, an optical zoom of the camera 210 may narrow the camera field of view 212. In some implementations, a plurality of cameras 210 may be used, and may face in different directions.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation, the actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 132 may use the different views to monitor objects within the environment.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene and/or the user device 118. For example, the user may make a particular noise, such as a tap on a wall or snap of the fingers, which are pre-designated to initiate an augmented reality function. The user may alternatively use voice commands for interaction with the ARFNs. The user may also interact with the user device 118, which may cause the user device 118 to output particular sounds or frequencies. Such audio inputs may be located within the scene using time-of-arrival differences among the microphones and used to summon an active zone within the augmented reality environment. Further, the microphones 218 may be used to receive voice input from the user for purposes of identifying and authenticating the user.

One or more speakers 220 may also be present to provide for audible output. For example, the speakers 220 may be used to provide output from a text-to-speech module, to playback pre-recorded audio, etc.

A transducer 222 may be present within the ARFN 102(1), or elsewhere within the environment, and configured to detect and/or generate inaudible signals, such as infrasound or ultrasound. The transducer 222 may also employ visible or non-visible light to facilitate communication. These inaudible signals may be used to provide for signaling between accessory devices and the ARFN 102(1).

A ranging system 224 may also be provided in the ARFN 102 to provide distance information from the ARFN 102 to an object or set of objects. The ranging system 224 may comprise radar, light detection and ranging (LIDAR), ultrasonic ranging, stereoscopic ranging, one or more interferometers, and so forth. In some implementations, the transducer 222, the microphones 218, the speaker 220, or a combination thereof may be configured to use echolocation or echo-ranging to determine distance and spatial characteristics. Further, any one of, or any combination of, the ranging system 224, the transducer 222, the camera 210, or other components of the ARFN may be used to determine the distance to an image or a display surface, a size of an image, an orientation of a display surface or the like according to the implementations herein.

A wireless power transmitter 226 may also be present in the ARFN 102, or elsewhere within the augmented reality environment. The wireless power transmitter 226 is configured to transmit electromagnetic fields suitable for recovery by a wireless power receiver and conversion into electrical power for use by active components in other electronics, such as non-passive user device 118. The wireless power transmitter 226 may also be configured to transmit visible or non-visible light to communicate power. The wireless power transmitter 226 may utilize inductive coupling, resonant coupling, capacitive coupling, and so forth.

In this illustration, the computing device 120 is shown within the chassis 204. However, in other implementations all or a portion of the computing device 120 may be disposed in another location and coupled to the ARFN 102(1). This coupling may occur via wire, fiber optic cable, wirelessly, or a combination thereof. Furthermore, additional resources external to the ARFN 102(1) may be accessed, such as resources in another ARFN accessible via a local area network, cloud resources accessible via a wide area network connection, or a combination thereof.

The ARFN 102(1) is characterized in part by the offset between the projector 206 and the camera 210, as designated by a projector/camera linear offset "O." This offset is the linear distance between the projector 206 and the camera 210. Placement of the projector 206 and the camera 210 at distance "O" from one another may aid in the recovery of structured light data from the scene. The known projector/camera linear offset "O" may also be used to calculate distances, dimensioning, and otherwise aid in the characterization of objects within the scene 202. In other implementations, the relative angle and size of the projector field of view 208 and camera field of view 212 may vary. In addition, the angle of the projector 206 and the camera 210 relative to the chassis 204 may vary or may be variable by actuators.

Due to this offset "O," the projector 206 and camera 210 employ separate optical paths. That is, the projector 206 employs a set of lenses to project images along a first optical path therein, and the camera 210 employs a different set of lenses to image the scene by capturing the light scattered by the surroundings. In other examples, as discussed below, the projector 206 and the camera 210 may employ the same optical path. Furthermore, the ARFN 102(1) may include one or more IR light sources 228 for illuminating the scene 202 with structured or nonstructured non-visible light. Accordingly, the vision system may rely on non-visible light in addition to or instead of visible light for performing functions such as capturing user gestures, recognizing users, detecting objects in the scene, and so forth. In some examples, the IR sources 228 may be a ring of IR LEDs (light emitting diodes) arranged around the camera 210 to project IR light toward the scene 202. In other examples, the IR source(s) 228 may include an IR laser or any other suitable source of visible or non-visible light. For instance, the camera 210 may be capable of detecting IR light in addition to or instead of visible light.

In other implementations, the components of the ARFN 102(1) may be distributed in multiple locations within the environment 100. As mentioned above, microphones 218 and speakers 220 may be distributed throughout the scene. The projector 206 and the camera 210 may also each be located in separate chassis 204.

Figure 3:
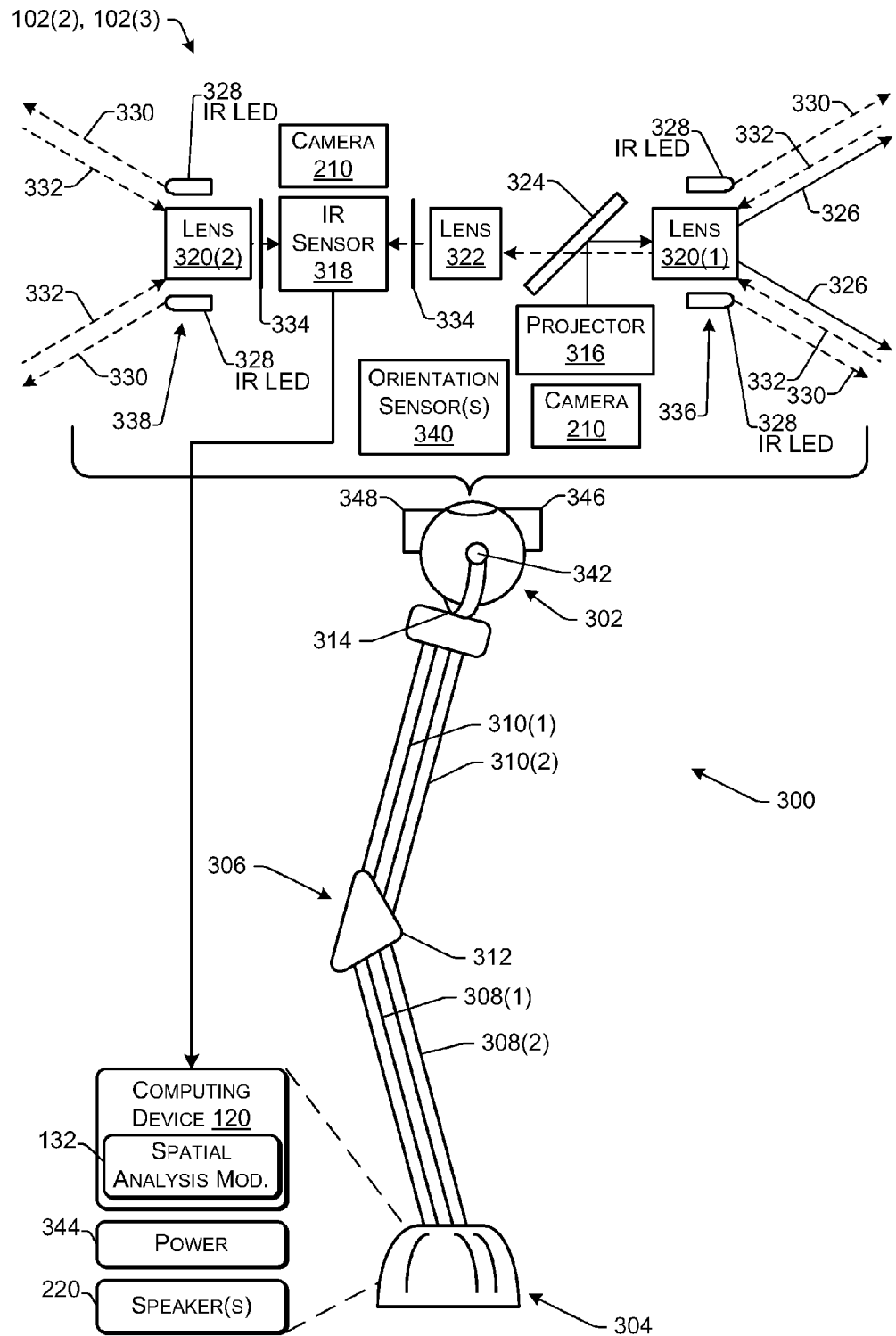
FIG. 3 illustrates an implementation of a projection and image capturing system resembling a familiar type of furniture, such as a table lamp. In this implementation, the projector and camera may share a common optical path through a common lens.

FIG. 3 illustrates one implementation 300 of the ARFN 102(2) or 102(3), implemented with the appearance of a table lamp, although the components may be incorporated into other types of furniture or other design configurations. While not all of the components discussed above are shown in FIG. 3, the ARFN 102 of FIG. 3 may include some or all of the components and functionality discussed above with respect to the ARFN 102(1) of FIG. 2. Further, the optical components described in this implementation may be embodied in a non-furniture arrangement, such as a standalone unit placed in the room or mounted to the ceiling or walls (i.e., similar to the ARFN 102(1) described above), or incorporated into fixtures such as a ceiling light fixture. The implementation 300 has a head 302 attached to a base 304 by a movable arm mechanism 306. As illustrated, the arm mechanism 306 has two base members or rods 308(1) and 308(2) connected to two head members or rods 310(1) and 310(2) via a joint connector 312. Other configurations of the arm mechanism 306 may be used.

In the illustrated implementation, the head 302 is connected to the arm mechanism 306 via a universal connector 314 that enables at least two degrees of freedom (e.g., along tilt and pan axes). The universal connector 314 is described below in more detail with reference to FIG. 6. In other implementations, the head 302 may be mounted to the arm mechanism 306 in a fixed manner, with no movement relative to the arm mechanism 306, or in a manner that enables more or less than two degrees of freedom. In still another implementation, a pan may be coupled to the base 304 to enable rotation of the arm mechanism 306 and the head 304.

The head 302 holds several components, including a projector 316 and an IR sensor 318. In this example, the IR sensor 318 detects IR light reflections from objects within a scene or environment. The IR sensor 318 may be implemented as a standalone sensor, or as part of a camera 210. The head 302 also contains one or more lenses, including a pair of first lens 320(1)-(2) and a second lens 322. The first lenses 320 include a front facing lens 320(1) and a rear facing lens 320(2). The lenses 320 may be implemented in a number of ways, including as a fixed lens, wide angle lens, or as a zoom lens. When implemented as a zoom lens, the lenses 320 may have any zoom range, with one example being 17-50 mm. Use of a zoom lens also offers additional advantages in that a zoom lens permits a changeable field of view (FoV), which can increase pixel resolution for better gesture recognition. Further, by zooming in, the device can decrease the field of view and enable the ability to discern fingers that were not resolved in non-zoomed (larger field of view) state. The first lenses 320 may further include a motorized focus, a motorized zoom, and a motorized iris (not shown in FIG. 3). The second lens 322 may be provided to adjust for the differences between the projection imager (not shown) and the IR sensor 318. This allows for the ARFN 102 to set relative coverage of the two imagers (e.g., overscan/underscan).

The projector 316 projects an image that is reflected off an angled beam splitter 324 and out through the lens 320. For example, the beam splitter 324 may be embodied as a dichroic beam splitter having a coated prism assembly that employs dichroic optical coatings to divide light. For example, the dichroic coating may reflect visible light while allowing IR light to pass through the coating. Alternatively, in other examples (not shown in FIG. 3), the dichroic coating may allow visible light to pass through while reflecting IR light. The projected image has a field of view represented by the outgoing pair of arrows 326. In this manner, the visible and high intensity light from the projector can be zoomed for image projection on a wide range of surfaces, from near view to far view surfaces.

One or more IR emitters 328, such as IR LEDs, are positioned in the head 302 relative to each of the lenses 320 to emit IR light, as represented by arrows 330. The IR signals are scattered from objects in the scene and returned to the respective lens 320(1) or 320(2), as represented by the incoming pair of arrows 332. The captured IR signals are passed through the respective lens 320(1) or 320(2) and, on the projection side (i.e., from front facing lens 320(1)), are passed through the dichroic beam splitter 324 to the secondary lens 322. The IR signals are then optionally passed through an IR filter 334 (or other filter type) to the IR sensor 318. In other implementations, the IR signals may be passed directly to the IR sensor 318, without going through the IR filters 334. Accordingly, the IR signals are emitted out from the head 302, scattered by the objects, and collected by the head 302 for capture by the IR sensor 318 as a way to image a scene. The illuminated area may be roughly the same size, or slightly larger, than the area onto which images are projected, as is described with reference to FIG. 5 below. This technique may be performed in lieu of using structured light, which is discussed below with respect to FIG. 4.

A first set 336 of one or more of the IR emitters 328 direct IR light in the direction of the projected image to illuminate a scene onto which the image is being projected. The first set 336 of IR emitters 328 may be arranged such that the illumination field is wider than the projection field of view, as represented by the outgoing pair of arrows 330, and as further described with respect to FIG. 5 below. Accordingly the projector 316 shares an optical path with the reflected IR light 332 at least through the lens 320(1), i.e., the projected light 326 passes out through the lens 320(1), while the reflected IR light 332 passes into the projector system through the lens 320(1).

Similarly, a second set 338 of one or more IR emitters 328 direct IR light in a direction away from the projection direction. Thus, the second set 338 of the IR emitters may be arranged to emit IR light in a direction opposed to, or otherwise in a direction away from, the direction of the projection of the image. For example, when the projector 316 projects an image onto a generally vertical surface, the ARFN 102 may activate the second set 338 of IR emitters to provide rear sensing vision in a rearward direction, or in a direction away from the projected image.

In this example, a single IR sensor 318 may receive IR signals both from the front lens 320(1) and from the rear lens 320(2), since the first set of IR emitters 336 may be operated mutually exclusively of the second set of IR emitters 338. For example, a suitable mirror arrangement, an offset arrangement, or the like, (not shown in FIG. 3) may be provided to enable sharing of the IR sensor 318 by the two optical paths corresponding to the front lens 320(1) and the rear lens 320(2). In other examples, the IR sensor 318 may be flipped to face whichever of the front lens 320(1) or rear lens 320(2) that is expected to receive emitted IR light. Thus, in some cases, the ARFN 102 may include a mechanism for switching the optical components between the front sensing mode and the rear sensing mode.

In still other examples, two IR sensors 318 may be provided, in which case, emitted IR light may be sensed from both the front and the rear of the projector system simultaneously. Accordingly, the ARFN 102 may be operated in both the front sensing mode and the rear sensing mode contemporaneously. For instance, multiple users may make gestures both in front of the ARFN 102 and from the rear of the ARFN 102, such as by taking turns, at the same time, in synchronized or choreographed motion, and so forth. Further, a single user may move from the rear to the front of the ARFN 102, or vice versa, and may make gestures at either location (e.g., within a field of view of the front lens or a field of view of the rear lens) to interact with the projected image.

As still another example, rather than having two sensors 318 for contemporaneous front and rear sensing, a single sensor 318 may be used in an interleaved mode in which images are alternately projected onto the sensor 318 from the front optical path and from the rear optical path. For example, suppose that the sensor 318 is able to capture 120 frames per second. Then, the sensor 318 may capture 60 frames or images from the front optical path, alternating with 60 frames or images from the rear optical path. In some cases, operation of the first set 336 of IR emitters may be alternated in a coordinated fashion with operation of the second set 338 of IR emitters in an interleaved strobe-like manner. For example, a signal from the computing device 120 may operate the first set 336 to be on for 60 cycles per second and off for 60 cycles off per second, while the second set 338 may be operated to be on during the time when the first set 336 is off, and off when the first set 336 is on. Thus, first IR light from the first set 336 is flashed multiple times per second in the projection direction, alternating with flashing of second IR light from the second set 338 multiple times per second in a direction opposite to or away from the projection direction. The IR sensor 318 is operated in coordination with the signal driving the sets 336 and 338 of IR emitters to receive the reflected first IR light and reflected second IR light, and associate each captured image with either the front optical path or the rear optical path, respectively. As another alternative, the sets 336 and 338 of IR emitters may remain in constant on state, and instead shutters, a spinning mirror, or other suitable mechanisms (not shown in FIG. 3) may be utilized along the optical paths for controlling the interleaving of the images received along the front and rear optical paths. Further, while 120 hertz has been provided as an example of frame capture interleaving rate, the rate may be higher or lower, depending on the characteristics of the sensor 318, the IR light emitters, shuttering mechanisms, and the like.

The ARFN 102 of FIG. 3 may further include one or more orientation sensors 340. For example, the orientation sensor 340 may be an accelerometer that can detect an orientation of the head 302 or a change in the orientation of the head 302 (and thereby a change in orientation of the projector, the axis of projection, and the lenses 320). In other examples, the orientation sensor 340 may include a rotational sensor, such as a potentiometer, or the like, located at a pivot point 342 of the head 302, and able to detect a change in an angle or orientation of the head with respect to the pivot point 342. Numerous other types of orientation sensors 340 will be apparent to those of skill in the art having the benefit of the disclosure herein.

Further, in other implementations (not shown in FIG. 3), the projector 316 may be arranged to project an image that is passed through the beam splitter 324 and out through the lens 320, rather than being reflected by the beam splitter 324. In this arrangement, the returning IR signals maybe received back through the lens 320 and reflected by the beam splitter 324 to the lens 322 and IR sensor 318. In other words, the projector 316 and IR components (i.e., IR sensor 318, lens 322 and optionally filter 334) may be swapped so that the returning IR signals are reflected by the beam splitter 324 rather than the projected image. Accordingly, in this example, the dichroic coating on the beam splitter 324 reflects IR light while allowing visible light to pass through. One or more additional mirrors may be provided to reflect the IR signals received at the rear side of the ARFN to direct the IR signals to the IR sensor 318, thereby enabling sharing of a single light sensor. Other arrangements may also be possible where at least part of the optical path is shared by the projection and depth capture.

The ARFN 102(2) or 102(3) in the example of FIG. 3 may also be equipped with one or more components in the base 304. In this example, the computing device 120 for executing the spatial analysis module 132 and other modules described above resides in the base 304, along with power components 344 and one or more speakers 220. As discussed above with respect to FIG. 1, the computing device 120 may include processing and memory to execute instructions, as discussed above with respect to FIG. 1. The spatial analysis module 132 may be executed by the computing device 120 to measure a time of flight for an IR signal (or other modulated light output). The time-of-flight value may be derived as a function of a time elapsed between emission from an IR LED 328 and capture by the IR sensor 318. Alternatively, the time-of-flight value may be derived as a function of the phase difference between the modulated light output and the returned light. The spatial analysis module 132 may be implemented in software or hardware. It is noted that in other implementations, the components shown as residing in the base 304 may reside in the head 302, arm mechanism 306, or elsewhere. For instance, the computing device 120 may be located in the head 302, and the speakers 220 may be distributed in multiple locations, including the base 304, arm mechanism 306, and/or the head 302. Additionally, in some implementations, any of the components described above, such as the ranging system 224, the transducer 222, or other components may be included in the head 302 of the ARFN of FIG. 3.

In the implementation of FIG. 3, the projector 316 and the sensor 318 share a common optical path through a common lens 320 on the projector side. Further, the camera 210 may receive visible light through the front lens 320(1) along the same path as the projector. Additionally, a second camera 210 may be provided for receiving visible light along from the rear, or alternatively, a second dichroic reflector 324 may be provided between the rear lens 320(2) and the IR sensor 318 to direct visible light to a single camera 210. Thus, the ARFN 102 of FIG. 3 may be made more compact to a smaller form factor than that of FIG. 2, as one or more set of lenses may be removed in this design as compared to the offset design discussed above with respect to FIG. 2. Further, the head 302 includes a front lens enclosure 346 that contains and protects the front lens 320(1), and a rear lens enclosure 348 that contains and protects the rear lens 320(2). Accordingly, the orientation of the lenses 320 indicates a projection axis and optical axis of the ARFN, which may be used for determining an orientation of the projection system.

Figure 4:
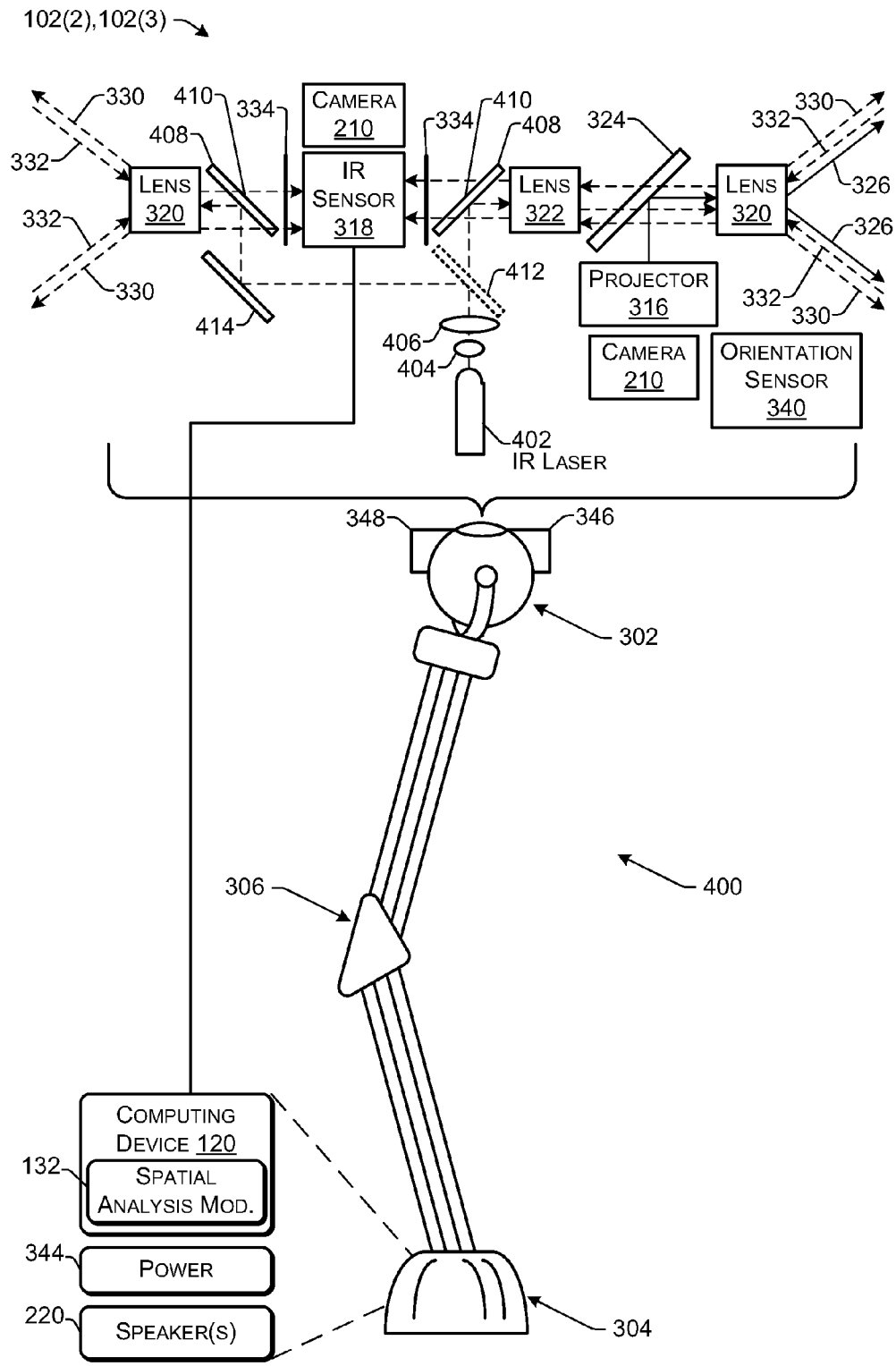
FIG. 4 illustrates an implementation of a projection and image capturing system resembling a table lamp similar to the implementation illustrated in FIG. 3. In this example, the projector and camera may share a common optical path through a common lens, and one or more illumination components may also share the same optical path.

FIG. 4 illustrates another implementation 400 of the ARFN 102(2) or 102(3), also shown implemented as resembling of a table lamp. This implementation differs from that of FIG. 3 in that the IR illumination system also shares the same optical path as the projector 316 and the IR sensor 318.

In FIG. 4, an IR laser 402 is used in place of the IR LEDs 328 of FIG. 3. The IR laser 402 outputs an IR beam that is expanded by a beam expander 404 and then concentrated by a focus lens 406 onto an angled beam splitter 408. In one implementation, the angled beam splitter 408 is formed of a material that passes light (e.g., glass) and has a reflective patch 410 at its center. The focus lens 406 concentrates the IR beam onto the reflective patch 410 of the beam splitter 408, which directs the beam through lens 322, through the beam splitter 324, and out through the lens 320. The reflective patch 410 covers the center portion of the beam splitter 408 and may have any number of shapes, such as circular, oval, polygonal, and so forth. With this arrangement, the size and area of interest can be controllably illuminated by use of the lens 320 and modulated IR laser light. The illuminated area may be roughly the same size, or slightly larger, than the area onto which images are projected, as is described with reference to FIG. 5 below.

IR signals scattered from a populated landscape are then collected by the head 302 and passed back through the lens 320, through the beam splitter 324, through lens 322 (on the projection side), through the non-reflective portion of the angled reflector 408, through the filter 334, and to the IR sensor 318. Accordingly, the collected scattered IR light may form an image on the IR sensor 318. The image may be used to compute time of flight values for depth analysis of the landscape of the scene.

When the image is to be projected onto a vertical surface, a mirror 412 may be interposed between the lens 406 and the angled reflector 408 to direct the laser beam to a second mirror 414, which reflects the laser beam to a second angled reflector 408 having a central reflective patch 410. The patch 410 reflects the laser beam through the lens 320 on the rear side of the ARFN. Thus, in some cases, the ARFN 102 may include a mechanism for switching the optical components between the front sensing mode and the rear sensing mode. Further, in the examples in which the ARFN 102 is operated in both front and rear sensing modes contemporaneously, a beam splitter or other suitable mechanism or technique may be used for directing the laser light to both the front and the rear contemporaneously. For example, the sensor 318 may be coordinated with the beam splitter for alternately receiving light reflected from the front and the rear of the ARFN 102 in the interleaved manner discussed above with respect to FIG. 3. Further, in some examples, the sensor 318 may include two light sensors such that a first sensor is positioned to receive reflected IR light through the front optical path and a second sensor is positioned to receive reflected IR light through the rear optical path. Various other techniques and configurations that also may be employed for directing the laser through the rear lens 320 will be apparent to those of skill in the art in light of the disclosure herein.

One of the advantages of placing the IR laser 402 as shown and passing the IR beam through the lens system is that the power used for illumination of a scene may be reduced as compared to the implementation of FIG. 3, where the IR LEDs are external to the optical path. Illumination typically degrades inversely proportional to the square of the distance. In FIG. 3, the forward and return paths result in an illumination inversely proportional to the distance to the power of four. Conversely, illumination through the same lens means that the returned light is inversely proportional to square of the distance, and therefore can use less intense illumination to achieve the same results.

Further, essentially any IR device may be used in the systems herein. Although IR LEDs and IR lasers are shown in the implementations of FIGS. 3 and 4, essentially any device that produces energy within the IR spectrum may be used, such as, for example, a regular red LED. Additionally, in some implementations, any of the components described above, such as the ranging system 224, the transducer 222, the separate camera 210, or other components may be included in the head 302 or other portions of the ARFN of FIG. 4.

Both implementations of the integrated projection and vision system afford advantages in addition to a smaller form factor. The projection and vision system allows for simultaneous and coaxial operation of the following functions: (1) visible light high intensity zoomable image projection; (2) illumination of a controlled area of interest with modulated IR light; and (3) collection of scattered IR light from a populated landscape to form an image on a time-of-flight camera/IR sensor.

Figure 5:
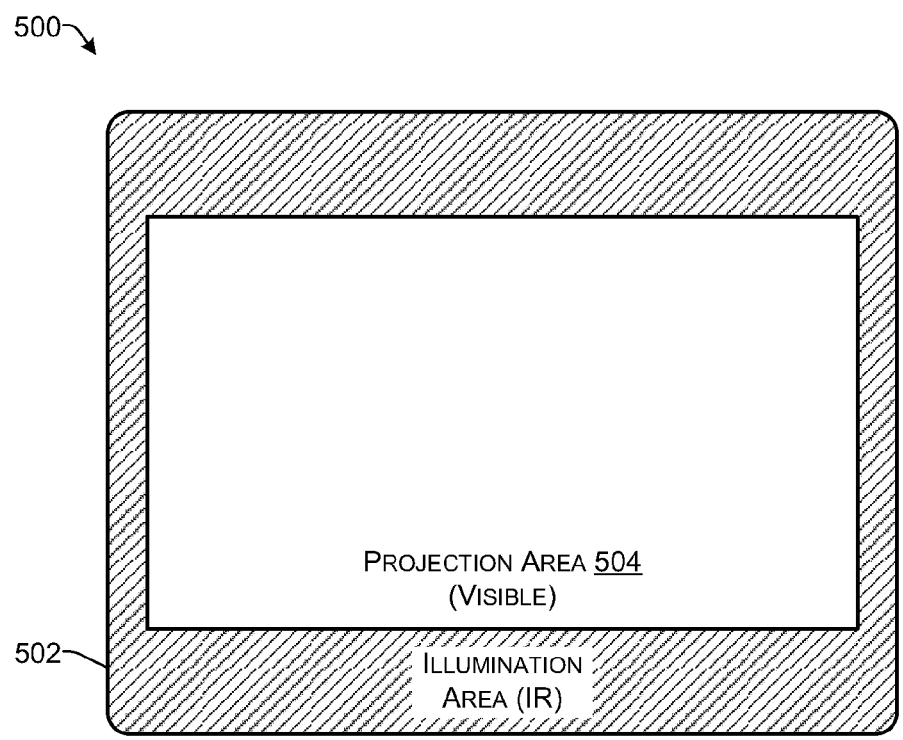
FIG. 5 illustrates a first area of illumination and a second area of image projection that may be realized by the examples illustrated in FIGS. 3 and 4.

FIG. 5 shows a coverage pattern 500 provided by the ARFN 102(2) or 102(3) in the direction of the projection of the image. The coverage pattern 500 has an illumination area 502 covered by the IR-based illumination system. The coverage pattern 500 also has a projection area 504 covered by the projected image. As shown in this footprint, the illumination area 502 is larger than, and encompasses, the projection area 504. However, in other implementations, the illumination area 502 may be equal to or smaller than, and be encompassed by, the projection area 504. The second lens 322 in the device allows for adjustment in the relative IR sensor field of view coverage of the illumination area to enable overscan or underscan conditions. Furthermore, the illumination area and field of view of the IR sensor to the rear of the ARFN 102(2) or 102(3) may be the same size, larger, or smaller than that in the forward sensing direction, depending at least in part on the expected distance to a user that will interact with the system.

Figure 6:
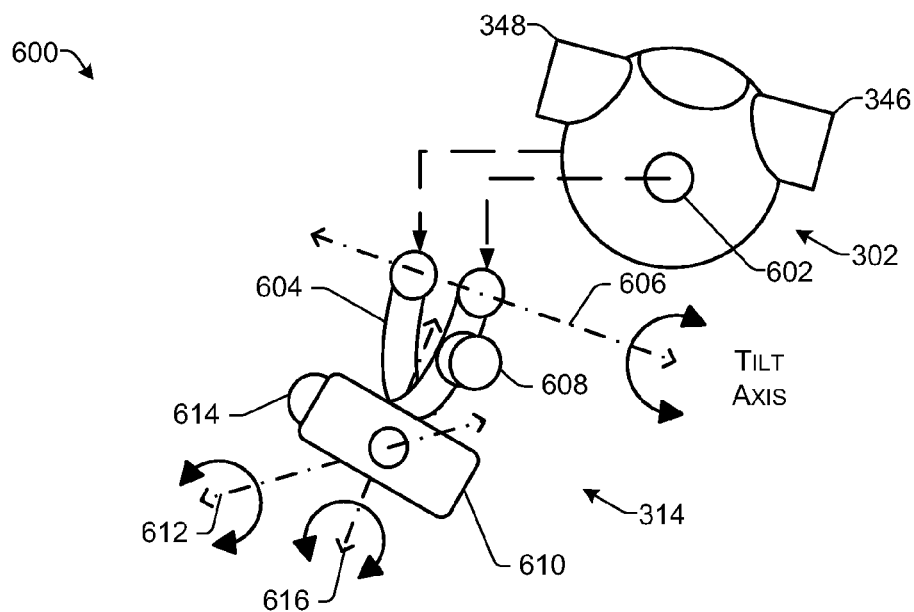
FIG. 6 shows an exploded view of a head and universal mount of the examples illustrated in FIGS. 3 and 4.

FIG. 6 shows an exploded view 600 of the head 302 and the universal mount 314 of the lamp implementation shown in FIGS. 3 and 4. Here, the head 302 is generally spherical, although it may be made of any shape, size or form factor. The head 302 has two mounting members 602 on opposing sides of the sphere. The mounting members 602 may be pivotally mounted within a U-shaped cradle 604 to facilitate rotation about a tilt axis 606. A tilt motor 608 may be included to move the head 302 about the tilt axis 606. In some examples, the tilt motor 608 may be a stepper motor, or the like, that provides an indication of the orientation or angle of the head 302.

The U-shaped cradle 604 is movably mounted relative to structural bracket 610. The U-shaped cradle 604 may be pivoted about a pan axis 612. A pan motor 614 may be included to pivot the U-shaped cradle 604 and head 302 about the pan axis 612. Additionally, the U-shaped cradle 604 may be rotatable about an axis 616 to rotate or spin relative to the structural bracket 610. In this example, the head 302 includes the front lens enclosure 346, which may correspond to the projection side of the head 302, and the rear lens enclosure 348, which may correspond to a non-projection side of the head 302. Accordingly, the front lens enclosure 346 may be referred to as the forward facing side of the head 302 and the rear lens enclosure 348 may be referred to as the rearward facing side of the head 302.

Figure 7:
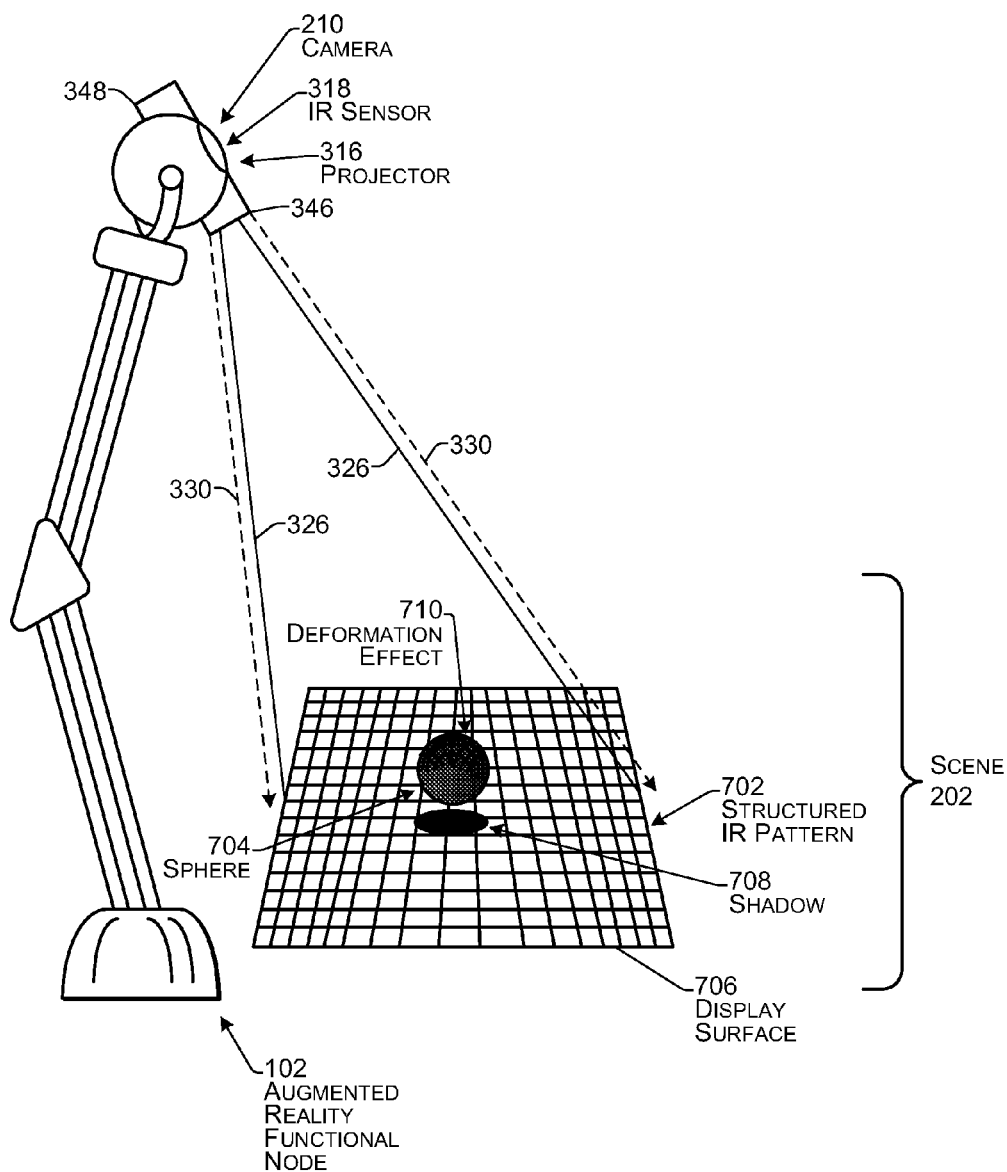
FIG. 7 illustrates an example projection system with for detecting objects in a scene according to some implementations.

FIG. 7 is an illustrative diagram of the ARFN 102 using structured IR to identify 3D information regarding users, user hands, and other objects within an environment. However, while the structured IR light techniques described herein provide one example for obtaining 3D information regarding these objects, it is to be appreciated that 3D information may be determined in other manners in other examples.

In the illustrated example, the projector 316 projects a structured IR pattern 702 onto a scene 704. In some implementations, a sequence of different structured IR patterns 702 may be used. In other implementations, other devices such as general room lighting may generate non-visible or visible structured light patterns. A light fixture, light bulb, or IR source may be configured such that emitted light contains one or more modulated structured IR patterns 702. For example, two structured light patterns may be presented, each at a different non-visible wavelength within the structure of an incandescent bulb.

The IR sensor 318 and/or the camera 210 may be used to detect the structured light, and may also be incorporated into bulbs or assemblies suitable for installation in existing light fixtures. These assemblies may be configured to communicate with the computing device 120 wirelessly or via transmission of a signal via the household electrical wiring. In some implementations, the assembly may provide pre-processing of input prior to sending data along to the computing device 104.

The structured IR pattern 702 may be in IR wavelengths that are non-visible to the user. In other examples, visible structure light may be used, or a combination of visible and IR light may be used. For example, while the electromagnetic energy used to sense user gestures is described in some examples as IR light, other wavelengths of electromagnetic energy may be used, such as visible light, ultraviolet light, or other forms of electromagnetic energy. The structured IR pattern 702 is shown in this example as a grid for ease of illustration and not as a limitation. In other implementations other patterns, such as bars, dots, pseudorandom noise, and so forth may be used. Pseudorandom noise (PN) patterns are useful as structured IR patterns because a particular point within the PN pattern may be specifically identified. A PN function is deterministic in that, given a specific set of variables, a particular output is defined. This deterministic behavior allows for specific identification and placement of a point or block of pixels within the PN pattern. In some implementations, a plurality of structured IR patterns 702 may be used to image the scene. These may include different PN patterns, geometric shapes, and so forth.

For illustrative purposes, a sphere 704 is shown positioned between the projector 106 and a display surface 706 in the scene 202. A shadow 708 from the sphere 704 appears on the display surface. Inspection of the sphere 704 shows a deformation or distortion effect 710 of the structured IR pattern 702 as it interacts with the curved surface of the sphere 704. In some implementations, other effects, such as dispersion of the structured IR pattern 702, may be used to provide information on the topology of the scene. Where the projector 106 and camera 210/IR sensor 318 have differing fields of view, such as discussed above with respect to FIGS. 2 and 5, the dispersion or change in the "density" of the structured IR pattern 702 may be used to determine depth of field.

The IR sensor 318 and/or the camera 210 may detect the interaction of the structured IR pattern 702 with objects within the scene 202. For example, the deformation effect 710 on the sphere 704 may be detected by the camera 210 and the IR sensor 318. Information from the camera 210 and/or IR sensor 318 may similarly be used by the computing device 120 to identify deformation effects on users within the environment and may this deformation information may be used to identify user gestures and trajectories of these gestures. That is, information from the camera 210 and/or IR sensor 318 may identify, via deformation in the structured IR pattern 702, a location of a selection tool (e.g., a user's finger or hand) as this location changes over time. The computing device 120 may then use these locations tracked over time to identify a trajectory of the gesture.

Figure 8:
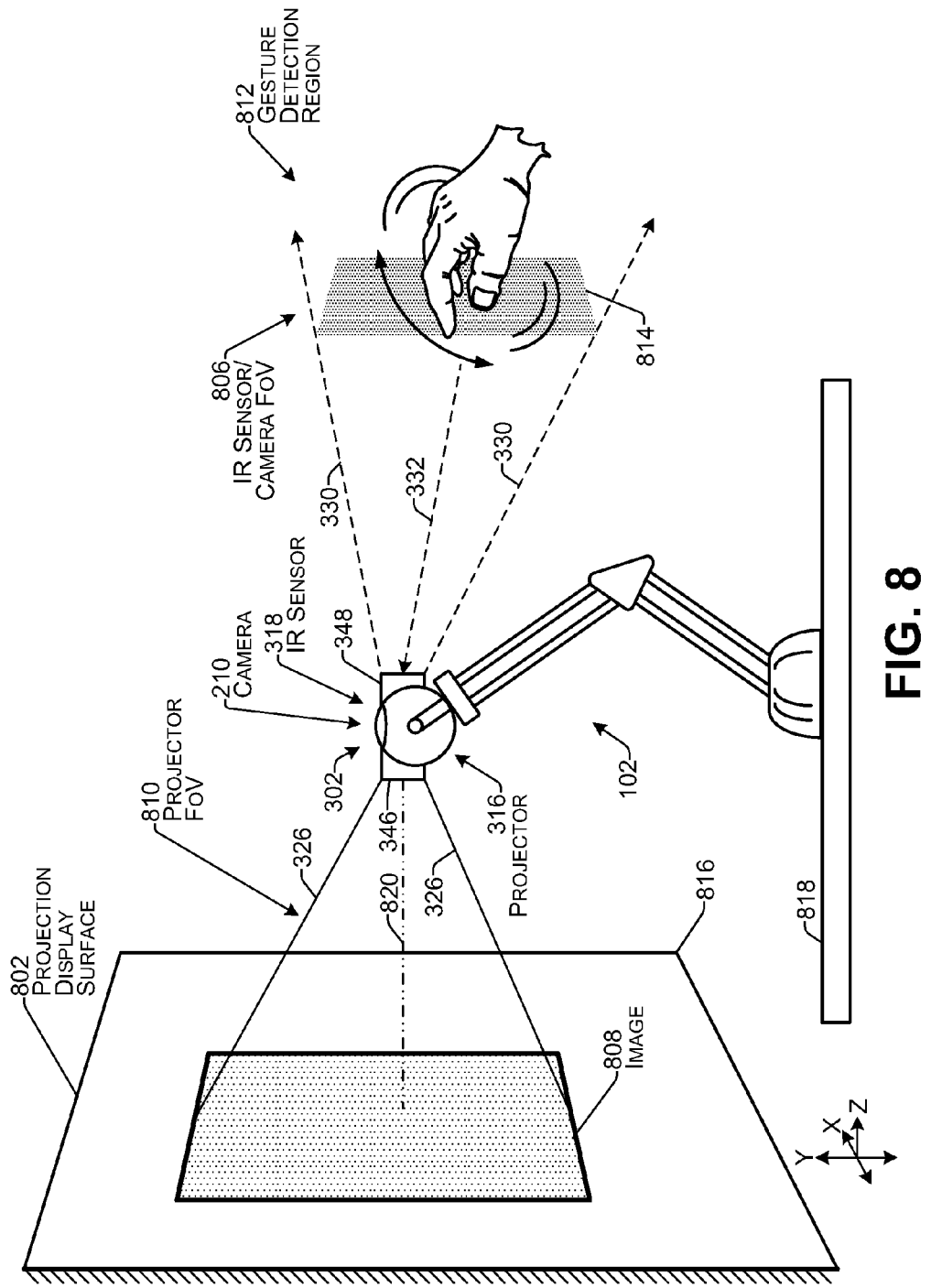
FIG. 8 illustrates an example projection system operable in a rear sensing mode for sensing gestures according to some implementations.

FIG. 8 illustrates an example environment 800 in which an ARFN 102, such as the ARFN 102(2) or 102(3) described above, may be used to observe and identify hand gestures in a rear sensing mode, such as when projecting an image onto a substantially vertical projection display surface 802. FIG. 8 shows a person's hand 804 as an example of an object within the environment that may be analyzed by the ARFN 102. To identify hand gestures, the ARFN 102 detects and tracks the hand 804 within a field of view 806 of the IR sensor 318 and/or camera 210.

As discussed above, one or more modules executable on the computing device 120 associated with the ARFN 102 may generate a depth map from the vision system information. The depth map may be used to identify the hand 804 of a user, and to determine changes in the location and position of the hand 804 over time. Specifically, the ARFN 102 may identify a sequence of hand positions or poses that form a hand gesture that is recognizable by the gesture recognition module 152 discussed above. A hand gesture may be defined by a series of poses of the hand 804, where each pose indicates the 3D position of the hand 804 and the 3D angular orientation of the hand 804. Position and angular orientation may be evaluated as absolute positions and orientations or as relative positions and orientations. As an example, 3D position coordinates may be specified relative to orthogonal X, Y, and Z axes of a global coordinate system for the environment. 3D angular orientations may be specified as rotations about the X, Y, and Z axes. Furthermore, the orientation of the display surfaces and/or the orientation of the head 302 of the ARFN 102 may be determined based on the global coordinate system for the environment. For example, a horizontal surface may generally be in the plane of the X and Z axes, while a vertical surface may generally include the Y axis as a component.

As described above, the IR sensor 318 and/or the camera 210 may be used in conjunction with a structured IR pattern projected by the IR emitters or other light sources to capture 3D information regarding objects within the rear field of view 806. For example, the detected hand gestures may enable a user to interact with an image 808, such as a graphic interface, digital content, or the like, projected onto the projection display surface 802. Thus, the projector 316 may project light corresponding to the image 808 in a projection direction onto the projection display surface 802 within a projector field of view 810.

Furthermore, when in the rear sensing mode, as illustrated, the ARFN 102 may emit IR light in a direction away from the projection direction. For example, the IR light may be emitted rearward, in a direction opposite to the projection direction. The IR light that is reflected back from any objects is detectable within the field of view 806 of the IR sensor 318 and/or camera 210. The reflected light pattern can be analyzed to reconstruct 3D characteristics or models of the objects within the field of view 806. Accordingly, the rearward sensing mode illustrated in FIG. 8 may provide a gesture detection region 812 within the field of view 806 of the IR sensor 318. Further, in some cases, the gesture detection region 812 may include a virtual wall or selection plane 814 upon which the user may make suitable gestures for interacting with the projected image 808.

In some examples, the ARFN is able to detect any gestures made by a user at any location within the field of view 806, e.g., without limit to a particular distance from the ARFN 102, depending on the resolution of the IR sensor 318 and/or camera 210. Accordingly, in these examples, the user may make a gesture anywhere within the field of view 806 for interacting with the image 808 projected onto the display surface 802. In other examples however, the virtual selection plane 814 may represent a virtual plane that the ARFN 102 may reference when determining whether or not a user is making a selection type gesture. That is, the ARFN 102 may define a virtual plane 814 that is substantially parallel to the display surface 802 on which the image 808 is projected and, when pierced by a gesture of the user, results in a selection being made, such as in a graphic interface included in the projected image.

As one example, the ARFN 102 may define the virtual plane 814 as a selection plane relative to the wall or projection surface 802 on which the image 808 is projected. As other examples, the ARFN 102 may define the selection plane as a certain distance from the ARFN 102 or a certain distance from the user in the direction of the ARFN 102. In some instances, the user may define the location of the virtual plane 814 by, for example, providing an audible command or a gesture to the ARFN 102 indicating a distance of the selection plane from the user. Of course, in each of these instances it is to appreciated that the virtual wall selection plane might not be visually perceptible to the user, but instead represents a depth within the environment at which the ARFN 102 will interpret a gesture of the user as making a selection or other action for interacting with the image 808.

When the user makes a gesture towards the image 808, but prior to piercing to the virtual selection plane 814, the ARFN 102 may provide feedback to the user indicating a portion of the image 808 with which the user is currently interacting. For example, if the image includes a graphic user interface, the ARFN 102 may highlight one or more buttons or items as a user's hand moves from one position to another. Thereafter, if the user's gesture continues moving towards that portion when the gesture pierces the virtual selection wall 808, the ARFN 102 will interpret the gesture as a selection of that portion of the graphic interface. Audio clues may be provided contemporaneously to correspond with movements of the user's hand to further guide the user.

In addition to being used to observe a reflected light pattern in some examples, as described above, the camera 210 of the ARFN 102 may be used to capture 2D images of the environment or the user. For example, the camera 210 may be used in conjunction with ambient lighting to capture a 2D image of the user, such as for enabling video conferencing, facial recognition, and so forth. The captured 2D image may be a color or grayscale image, comprising an array of pixels defined by tone or color intensities. Further, some examples may implement 3D shape detection, analysis, and reconstruction using techniques that do not involve the projection and/or analysis of structured IR or visible light. Accordingly, structured IR or light analysis is described as merely one example of various 3D analysis techniques that may be used to identify 3D shapes within a scene or within regions of a scene.

In the illustrated example, the projection display surface 802 may be an area of, or may be located on, a support 816. In some cases, the support 816 may be a wall, stand, screen, or any other suitable structure. In other cases, the support 816 may be a portable support or portable display surface, such as part of a mobile or portable device. The device 118 discussed above with respect to FIG. 1 is an example of a portable device that may receive and display a projected image in a vertical orientation, a horizontal orientation, or an orientation in between vertical and horizontal.

The projection display surface 802 may be any suitable surface capable of receiving and reflecting light projected from the projector 316 to display the image 808. In some examples, the display surface 802 may be a display medium such as a reflective sheet of a projection screen material, which may include screens coated with magnesium carbonate, titanium dioxide or other bright reflective material. In other examples, the display surface may be a reflective, lenticular or micro-faceted material, such as acrylic or glass, which provides superior directional display characteristics. In still other examples, the display surface may merely be a surface of a wall or any other suitable surface, and may not necessarily be a flat surface, but may be a curved surface, a patterned surface, an irregular surface, or the like. For example, the display surface may include at least a portion having a curvature, such as in the shape of a concave or convex cylinder, hemisphere, etc. Further, the image 808 may be a still image, i.e., a single frame, or a moving image, such as a video that includes multiple frames displayed sequentially.

The ARFN 102 in this example is shown resting on a horizontal surface 818, which may correspond to a table, desk, floor, or any other suitable surface. As mentioned above, the ARFN 102 may include an orientation sensor that automatically detects an orientation of the ARFN or an orientation of a projection display surface 802 upon which the ARFN is projecting an image. For example, one or more orientation thresholds may be established at which the ARFN switches from a rear sensing mode as illustrated in FIG. 8, to a front sensing mode. As one example, when the orientation of the display surface 802 exceeds 45° towards vertical, the ARFN 102 may operate in the rear sensing mode. Likewise, when the orientation of the display surface is less than 45° the ARFN 102 may operate in the front sensing mode. Implementations herein are not limited to any particular orientation threshold for switching between the rear sensing mode and the front sensing mode, and 45° is only used as one non-limiting example. As another alternative, the orientation of the head 302, i.e., equivalent to the orientation of the projection axis or the optical axis 820, may be tracked for determining when to switch between the front sensing mode and the rear sensing mode. As a non-limiting example, when the orientation of the head (e.g., corresponding to the optical axis of projection 820 and thereby the orientation of the projector) is between horizontal and 45°, the ARFN may operate in the rear sensing mode. Likewise, when the orientation of the head is between 45° and vertical, the ARFN may operate in the front sensing mode.

Furthermore, in some examples, such as when there are two IR sensors 318, the ARFN 102 may operate in both the rear sensing mode and the front sensing mode contemporaneously, thereby providing one or more users with the option to make gestures both in front of and behind the ARFN 102. As mentioned above, a single user may move from the rear to the front of the ARFN 102, or vice versa, and may make gestures at either location to interact with the projected image. Thus, in some examples, the rather than switching between a front sensing mode and a rear sensing mode, the ARFN may operate contemporaneously in both the front sensing mode and the rear sensing mode. This also enables multiple users to make gestures both in front of the ARFN 102 and from the rear of the ARFN 102, such as contemporaneously, by taking turns, and so forth. In this example, the ARFN may be configured to automatically detect gestures made from both the front and the rear, and thus, the detected presence of the user or sensed gestures, rather than orientation information, may be used to determine a direction or source of input gestures. For instance, the tracking and control module 144 (discussed above) may determine when a user is within the field of view of the front or rear optical paths, and the gesture recognition module 153 (discussed above) may monitor for gestures input by the user regardless of the orientation of the optical paths. However, in some examples in which the front and rear sensing mode are operating at the same time, the orientation information from the orientation sensor(s) may also be taken into consideration when detecting gestures. For instance, it may be more likely that a gesture is being made from the rear of the ARFN 102 when the optical axis is closer to horizontal than vertical, and more likely that a gesture is being made from the front of the ARFN 102 when the optical axis is closer to vertical than horizontal.

Figure 9:
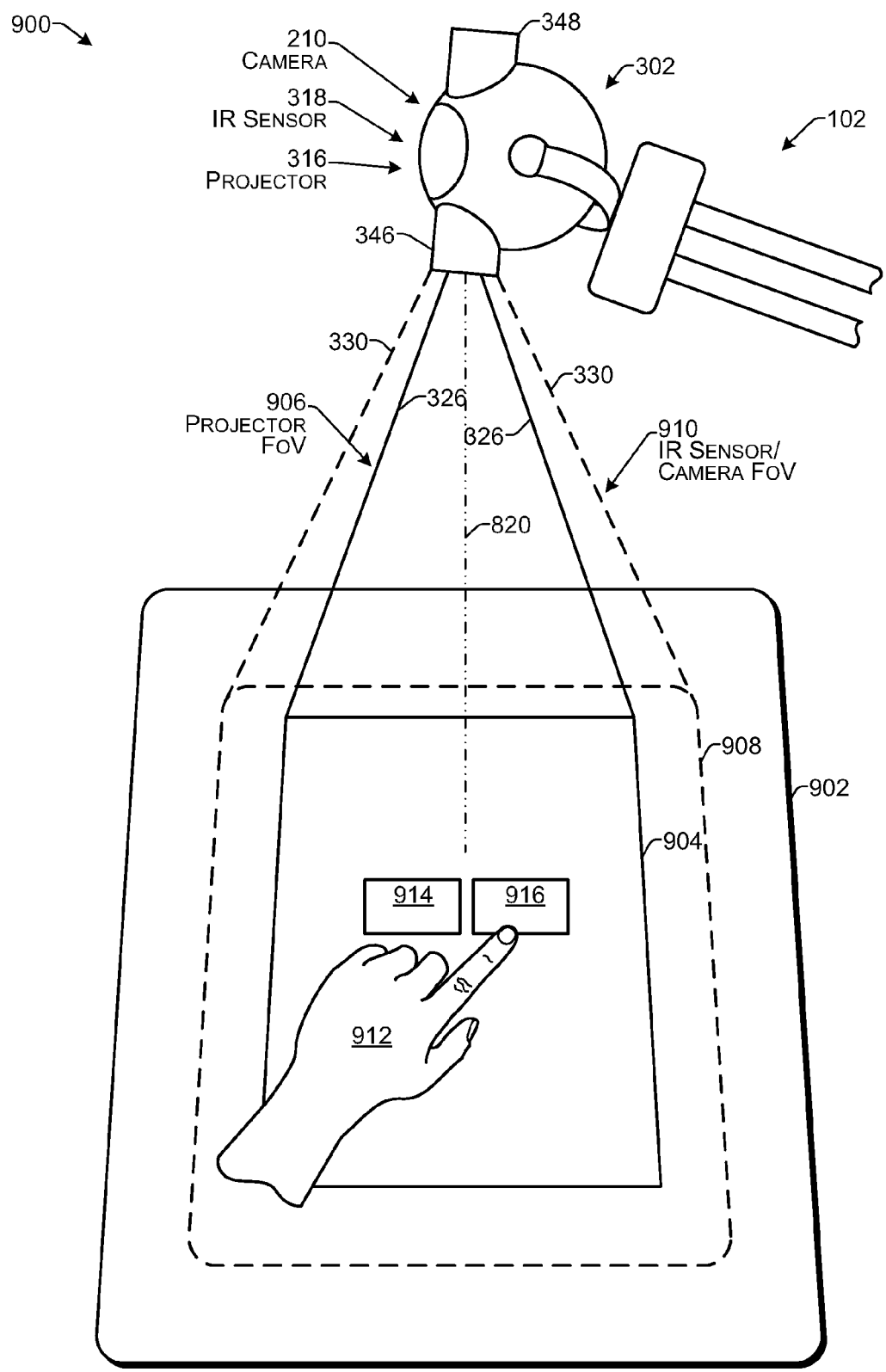
FIG. 9 illustrates an example projection system operable in a front sensing mode for sensing gestures according to some implementations.

FIG. 9 illustrates an example arrangement 900 of the front sensing mode according to some implementations. In this example, the ARFN 102 is configured to project downward onto a generally horizontal surface 902. The ARFN 102 projects an image 904 onto the display surface 902 within a projector field of view 906. Furthermore, the ARFN 102 emits IR light onto the display surface 902 to illuminate an area 908 that is detectable with in a field of view 910 of the IR detector 318 and/or camera 210. Accordingly, the head 302 of the ARFN 102 is configured in a substantially vertical configuration in which the axis of projection 820 is substantially vertical for projecting onto the generally horizontal surface 902. For example, upon detecting that the head 302 has been positioned within an orientation threshold, the ARFN 102 may automatically begin to operate in a front sensing mode. Thus, the ARFN 102 may determine an orientation of the projector 316 and projection axis 820, may determine a distance to the projected image 904 or display surface 902, may detect a size of the projected image 904, may detect an orientation of the display surface 902, or any combination thereof, for determining whether to operate in the rear sensing mode or the front sensing mode.

In the illustrated example, the IR light is reflected by any objects within the field of view 910, such as a user's hand 912. A portion of the IR light is reflected back toward the ARFN 102 for detection by the IR sensor 318. Accordingly, in this example, the user may use the hand 912 to interact with one or more virtual objects 914, 916 projected onto the display surface 902 as part of the image 904. For example, the user may place a finger onto the virtual object 916 for sliding the virtual object, depressing the virtual object, selecting the virtual object, or the like. This action by the user is detected by the ARFN 102, and the ARFN 102 may modify the image 904 according to the detected gesture and the current context of the image 904.

As one example, suppose that the user reconfigures the ARFN 102 from the configuration of FIG. 9 to the configuration of FIG. 8 (or issues a command that causes the ARFN 102 to reconfigure itself). Accordingly, upon detecting that the configuration of the ARFN 102 has changed, the presentation module 156 of the computing device 120 (discussed above with respect to FIG. 1), may automatically switch the ARFN 102 from the front sensing mode to the rear sensing mode as discussed above with respect to FIG. 8. For example, with respect to the ARFN 102(2), the ARFN 102(2) may activate the rear set 338 of IR emitters and deactivate the front set 336 of IR emitters. Further, if there are any other additional conversion steps necessary, such as flipping the IR sensor, moving one or more reflectors into position, or the like, these actions may also be performed in response to the detecting of the reconfiguration of the ARFN 102.

Additionally, in some examples, the one or more cameras 210, or other suitable sensors, may detect the presence of a user in front of or behind the ARFN 102. In these examples, rather than relying on the orientation information, the ARFN 102 may receive presence information that indicates the presence of one or more users in front of or in back of the ARFN 102. For example, the ARFN may initially detect from the presence information that the user, a user's hand, or other body part is in front of the ARFN, i.e., in the projection direction. Accordingly, the ARFN 102 may emit IR light in the projection direction for detecting gestures made by the user. Subsequently, suppose that the user moves behind the ARFN 102. Presence information based on information from the camera(s) 210 or other suitable sensor(s) may indicate that the user is now behind the ARFN 102, and thus, the ARFN 102 may begin emitting non-visible light to the rear of the ARFN 102 for detecting gestures made by the user from the new location behind the ARFN 102.

Further, in the case that one user is located in front of the ARFN 102 and another user is located behind the ARFN 102, the presence information may indicate the presence of both users, and the ARFN 102 may emit non-visible light both toward the projection direction and away from the projection direction contemporaneously, as discussed in some examples herein. Suitable sensors other than the camera(s) 210 for determining presence information may include motion sensors, sonar, range finders, LIDAR, depth sensors, and the like. Additionally, the IR sensor 318 may be used for detecting the presence of a user, such as by periodically flashing IR light to both the front and rear of the ARFN 102 for detecting the presence of a user. Other variations will also be apparent to those of skill in the art having the benefit of the disclosure herein.

Figure 10:
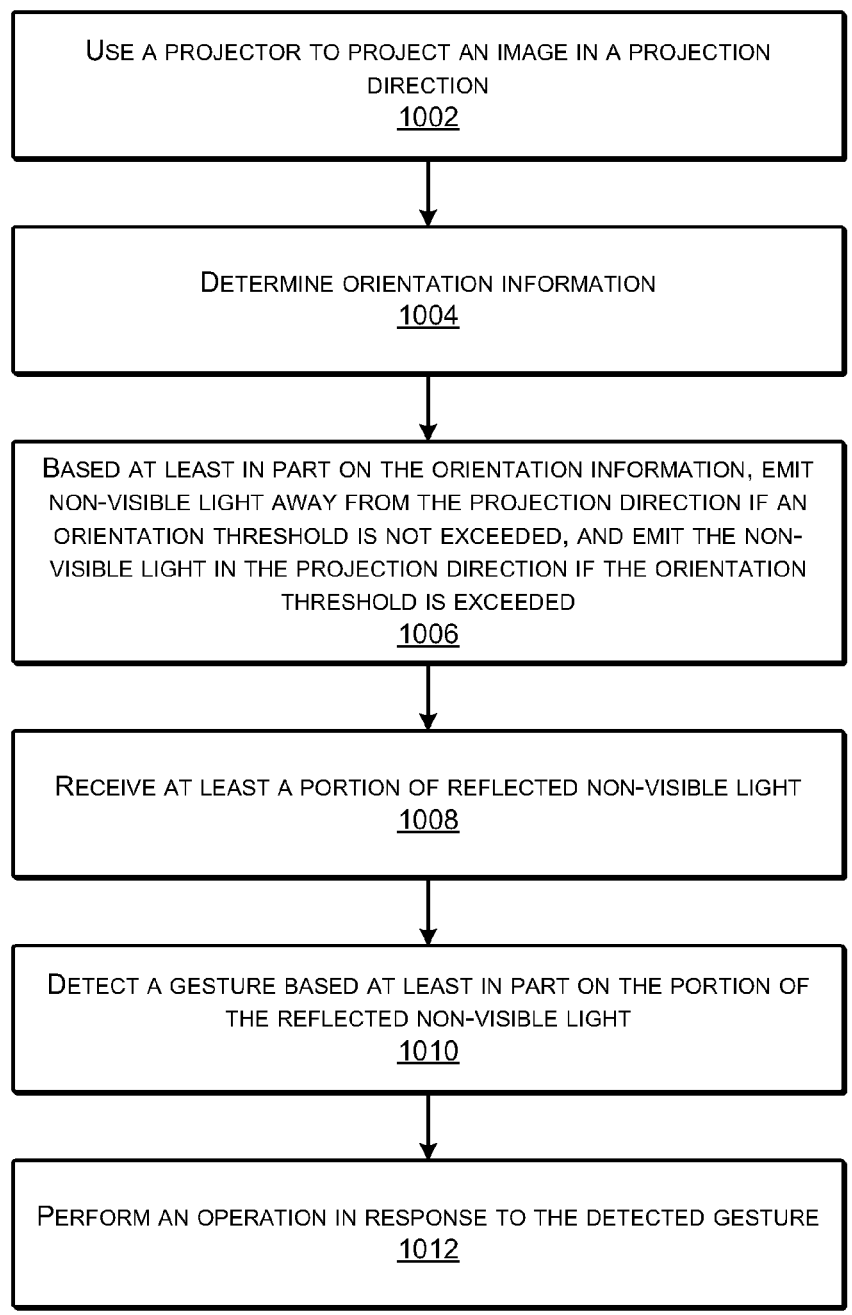
FIG. 10 is an example flow diagram of a process for controlling a vision system according to some implementations.
Figure 11:
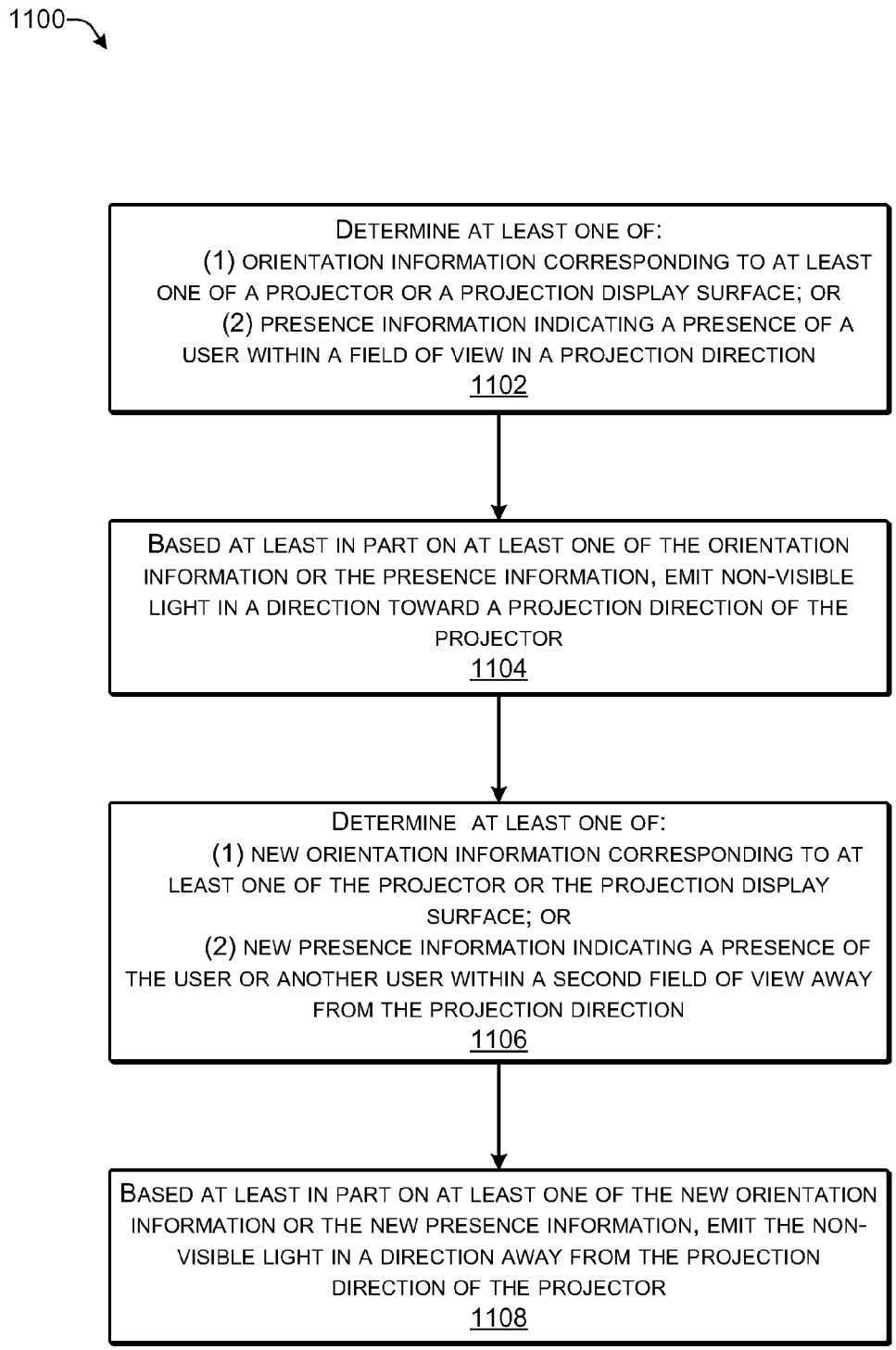
FIG. 11 is an example flow diagram of a process for controlling a vision system according to some implementations.
Figure 12:
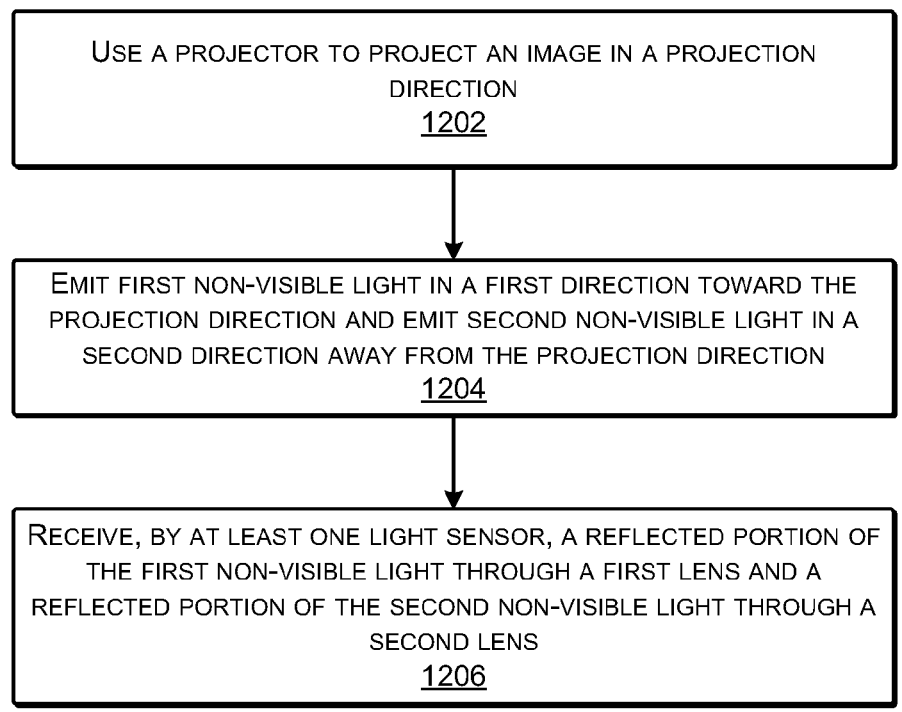
FIG. 12 is an example flow diagram of a process for controlling a vision system according to some implementations.

FIGS. 10-12 show illustrative processes for controlling a vision system according to some implementations. The processes described herein may be implemented by the architectures and systems described herein, or by other architectures and systems. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. Further, not all of the blocks are executed in each implementation. It is understood that the following processes may be implemented with other architectures as well.

FIG. 10 is a flow diagram of a process 1000 according to some implementations. In some examples, the process 1000 may be executed, at least in part, by one or more modules of the computing device 120 discussed above with respect to FIG. 1.

At 1002, the ARFN may use a projector to project an image in a projection direction. For example, the projector may project the image along a projection axis toward a projection display surface.

At 1004, the ARFN may determine orientation information. For example, the orientation information may be determined based on one or more of an orientation of the projection axis, or the projector, an orientation of the display surface, a distance to the display surface, a size of the projected image, a or a combination thereof.

At 1006, based at least in part on the orientation information, the ARFN emits non-visible light away from the projection direction if an orientation threshold is not exceeded, and emits the non-visible light in the projection direction if the orientation threshold is exceeded. For example, the vision system may operate in a front sensing mode if an orientation threshold indicates that the orientation of the display is closer to horizontal, and the vision system may operate in a rear sensing mode if the orientation threshold indicates that the orientation of the display is closer to vertical. Similarly, the vision system may operate in the rear sensing mode if an orientation of the projection axis or the projector is closer to horizontal, and the vision system may operate in a front sensing mode if the orientation of the projection axis or the projector is closer to vertical.

At 1008, the ARFN receives at least a portion of reflected non-visible light. For example, the reflected non-visible light may pass through the respective front or rear lens to impinge on the light sensor.

At 1010, the ARFN may detect a gesture based at least in part on the received portion of the reflected non-visible light. For example, the received IR light may be analyzed to determine whether there is an indication of a user gesture and/or to verify an identity of the viewer. In the case of a gesture, human movement may be interpreted as one or more gestures. Accordingly, the ARFN identifies possible candidate gestures, evaluates each gesture to select a most statistically probably candidate, and then implements the most likely candidate. As another example, in the case of identification verification, the IR light may be directed at the user's face, with reflected IR light being indicative of the facial shape and characteristics that may be used for user authentication.

At 1012, the ARFN performs an operation in response to the detected gesture. For example, the operation may be any type of user interaction with a graphic interface, or display content.

FIG. 11 is a flow diagram of a process 1100 according to some implementations. In some examples, the process 1100 may be executed, at least in part, by one or more modules of the computing device 120 discussed above with respect to FIG. 1.

At 1102, the ARFN determines at least one of: (1) orientation information corresponding to at least one of a projector or a projection display surface, or (2) presence information indicating a presence of a user within a field of view in a projection direction. For example, the orientation information may indicate an orientation of the projection axis and/or an orientation of the display surface such as vertical, horizontal or somewhere in between. Furthermore, the presence information may indicate whether the user is located in front of or behind the ARFN, such as based on information received from a camera or other sensor.

At 1104, based at least in part on at least one of the orientation information or the presence information, the ARFN may emit non-visible light in a direction toward a projection direction of the projector. For example, suppose that the orientation information indicates that the display surface is closer to horizontal and that the rejection axis is closer to vertical. Accordingly, the ARFN may operate the vision system in the front sensing mode by emitting IR light in the same direction as the projection direction. Similarly, when the ARFN detects that the user is in front of the ARFN, the ARFN may operate the vision system in the front sensing mode.

At 1106, the ARFN determines at least one of: (1) new orientation information corresponding to at least one of the projector or the projection display surface, or (2) new presence information indicating a presence of the user or another user within a second field of view away from the projection direction. For example, if the ARFN or the projection surface is moved or reconfigured, new orientation information may be determined, such as from a position sensor, camera information or the like. Similarly, if the user moves to the rear of the ARFN, or another user is present at the rear of the ARFN, then the ARFN may determine new presence information.

At 1108, based at least in part on at least one of the new orientation information or the new presence information, the ARFN may emit the non-visible light in a direction away from the projection direction of the projector. For example, suppose that the ARFN or the projection surface is reconfigured and the new orientation information indicates that the projection surface is now closer to vertical and the projection axis is now closer to horizontal. Accordingly, the ARFN may operate the vision system in the rear sensing mode by emitting non-visible light in a direction away from the projection direction. Similarly, if a user determined to be present behind the ARFN, the vision system may be operated in the rear sensing mode.

FIG. 12 is a flow diagram of a process 1200 according to some implementations. In some examples, the process 1200 may be executed, at least in part, by one or more modules of the computing device 120 discussed above with respect to FIG. 1.

At 1202, the ARFN may use a projector to project an image in a projection direction. For example, the projector may project the image along a projection axis toward a projection display surface.

At 1204, the ARFN may emit first non-visible light in a first direction toward the projection direction and emit second non-visible light in a second direction away from the projection direction. For example, the first non-visible light may be emitted toward the front of the ARFN, i.e., in a direction toward the projected image, while the second non-visible light may be emitted toward the rear of the ARFN, i.e., in a direction away from the projection direction.

At 1206, the ARFN receives, via at least one light sensor, a reflected portion of the first non-visible light through a first lens and a reflected portion of the second non-visible light through a second lens. For example, the reflected portion of the first non-visible light may be received along a first optical path including a first lens, while the reflected portion of the second non-visible light may be received along a second, different optical path including a second lens.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   a projector to project light corresponding to an image in a projection direction toward a display surface;
   one or more processors;
   one or more computer-readable media;
   at least one light emitter configured to emit non-visible light;
   a light sensor to detect the non-visible light; and
   one or more modules maintained on the one or more computer-readable media which, when executed by the one or more processors, cause the one or more processors to perform operations comprising:
      ascertaining whether the projector is (1) oriented so that the projection direction is within a first range of directions that includes a substantially horizontal direction or (2) oriented so that the projection direction is within a second range of directions that includes a substantially vertical direction;
      based at least partly on a first determination that the projector is oriented so that the projection direction is within the first range of directions, emitting first non-visible light in a first direction away from the projection direction, receiving at least a first portion of the first non-visible light reflected from one or more first objects in an environment, and detecting at least one first gesture in a first area outside of the first range of directions relative to the projector based on first information generated from the first non-visible light reflected from the one or more first objects in the environment;
      based at least partly on a second determination that the projector is oriented so that the projection direction is within the second range of directions, emitting second non-visible light in a second direction toward the projection direction, receiving at least a second portion of the second non-visible light reflected from one or more second objects in the environment, and detecting at least one second gesture in a second area within the second range of directions relative to the projector based on second information generated from the second non-visible light reflected from the one or more second objects in the environment.

2. The system as recited in claim 1, wherein the at least one light emitter comprises:
   a first light emitter positioned to emit the second non-visible light in the second direction toward the projection direction; and
   a second light emitter positioned to emit the first non-visible light in the first direction away from the projection direction.

3. The system as recited in claim 1, wherein the operations further comprise performing an operation based at least in part on at least one of the at least one first gesture or the at least one second gesture.

4. The system as recited in claim 1, wherein the projector shares an optical path with the second non-visible light reflected from the one or more second objects in the environment at a time at which the second non-visible light is emitted in the second direction toward the projection direction.

5. A method comprising:
   using a projector to project an image in a projection direction onto a surface;
   determining that the projection direction relative to the surface is in a substantially vertical direction;
   based at least partly on determining that the projection direction relative to the surface is in the substantially vertical direction, emitting first non-visible light into a first gesture area toward the projection direction;
   receiving a first reflected portion of the first non-visible light;
   based at least partly on the first reflected portion of the first non-visible light, detecting one or more first gestures made in the first gesture area;
   determining that the projection direction relative to the surface is in a substantially horizontal direction;
   based at least partly on determining that the projection direction relative to the surface is in the substantially horizontal direction, emitting second non-visible light into a second gesture area away from the projection direction;
   receiving a second reflected portion of the second non-visible light; and
   based at least partly on the second reflected portion of the second non-visible light, detecting one or more second gestures made in the second gesture area.

6. The method as recited in claim 5, wherein the substantially horizontal direction is on an opposite side of the projector from the surface in a direction away from the projection direction.

7. The method as recited in claim 5, further comprising performing an operation based at least partly on at least one of the one or more first gestures or the one or more second gestures.

8. The method as recited in claim 5, wherein determining the projection direction is based at least in part on information from a sensor associated with the projector, wherein the sensor comprises at least one of:
   an accelerometer; or
   a potentiometer.

9. The method as recited in claim 5, wherein:
   the projector projects the image through at least one lens; and
   a light sensor receives the first reflected portion of the first non-visible light through the at least one lens at a time at which the first non-visible light is emitted in the projection direction.

10. The method as recited in claim 5, wherein:
    detecting the one or more first gestures made in the first gesture area comprises receiving the first reflected portion of the first non-visible light that is reflected from at least a first portion of a body of a user; and
    detecting the one or more second gestures made in the second gesture area comprises receiving the second reflected portion of the second non-visible light that is reflected from at least a second portion of the body of the user.

11. The method as recited in claim 10, further comprising emitting the first non-visible light into the first gesture area and emitting the second non-visible light into the second gesture area concurrently.

12. The method as recited in claim 5, further comprising:
    determining a change in the projection direction relative to the surface from the substantially vertical direction to the substantially horizontal direction; and
    upon determining the change in the projection direction, detecting the one or more second gestures made in second gesture area.

13. The method as recited in claim 5, further comprising operating a camera to receive visible light from a direction that is determined based at least in part on the projection direction relative to the surface.

14. A system comprising:
a first lens to pass first projected content to and to receive first reflected non-visible light from a first field of view in a substantially vertical direction;
a second lens to pass second projected content to and to receive second reflected non-visible light from a second field of view in a substantially horizontal direction;
at least one light emitter to project light in a projection direction relative to a surface, the at least one light emitter to:
emit first non-visible light in the substantially vertical direction into the first field of view, the substantially vertical direction being the projection direction; and
emit second non-visible light in the substantially horizontal direction into the second field of view, the substantially horizontal direction being away from the projection direction;
at least one light sensor to receive the first reflected non-visible light through the first lens in the substantially vertical direction and to receive the second reflected non-visible light through the second lens in the substantially horizontal direction; and
a processor configured to receive information related to at least one of one or more first gestures detected based at least partly on the first reflected non-visible light or one or more second gestures detected based at least partly on the second reflected non-visible light.

15. The system as recited in claim 14, wherein the at least one light sensor comprises a single light sensor to obtain first images from the first reflected non-visible light received through the first lens, wherein the first images are interleaved with second images obtained from the second reflected non-visible light received through the second lens.

16. The system as recited in claim 14, wherein the processor is further configured to alternately flash the first non-visible light in the substantially vertical direction and the second non-visible light in the substantially horizontal direction.

17. The system as recited in claim 14, further comprising a projector to project the light corresponding to an image through at least one of the first lens or the second lens.

18. The system as recited in claim 14, wherein the projector is further configured to:
determining a change in the projection direction relative to the surface from the substantially vertical direction to the substantially horizontal direction; and
upon determining the change in the projection direction, detecting the one or more second gestures.

19. One or more non-transitory computer-readable media comprising instructions which, when executed by one or more processors, cause the one or more processors to perform operations comprising:
determining at least one of:
first orientation information corresponding to at least one of a projector, a projection display surface, or the projector relative to the projection display surface; or
first presence information indicating a presence of at least a portion of a user within a field of view in a projection direction;
based at least in part on at least one of the first orientation information or the first presence information, emitting non-visible light in a first direction toward the projection direction of the projector;
determining at least one of:
second orientation information corresponding to at least one of the projector, the projection display surface, or the projector relative to the projection display surface; or
second presence information indicating a presence of at least a portion of the user or another user within a second field of view away from the projection direction and
based at least in part on at least one of the second orientation information or the second presence information, emitting the non-visible light in a second direction away from the projection direction of the projector.

20. The one or more non-transitory computer-readable media as recited in claim 19, wherein the determining the first orientation information is based on at least one of:
a first orientation of an axis of projection of the projector;
a second orientation of the projection display surface that receives a projected image from the projector;
a size of the projected image; or
a distance from the projector to the projection display surface.

21. The one or more non-transitory computer-readable media as recited in claim 19, the operations further comprising:
receiving, by a light sensor, a reflected portion of the non-visible light;
determining, at least in part from the reflected portion of the non-visible light, a gesture made by the user or the other user; and
performing an operation based at least in part on the gesture.

22. The one or more non-transitory computer-readable media as recited in claim 19, the operations further comprising operating at least one camera for determining the first presence information and the second presence information.

23. A method comprising:
using a projector to project an image in a projection direction;
determining a first orientation of a projection surface relative to the projector;
emitting first non-visible light in a first direction toward the projection direction if based at least partly on a determination that an orientation of the projection surface is substantially in the first orientation;
receiving, by at least one light sensor, a first reflected portion of the first non-visible light through a first lens;
determining a change from the first orientation of the projection surface relative to the projector to a second orientation of the projection surface relative to the projector;
emitting second non-visible light in a second direction away from the projection direction based at least in part on the change; and
receiving, by the at least one light sensor, the first reflected portion of the first non-visible light through the first lens and a second reflected portion of the second non-visible light through a second lens.

24. The method as recited in claim 23, further comprising detecting a gesture based at least in part on at least one of the first reflected portion of the first non-visible light or the second reflected portion of the second non-visible light.

25. The method as recited in claim 23, wherein using the projector to project the image further comprises using the projector to project the image through the first lens through which the first reflected portion of the first non-visible light is received.

26. The method as recited in claim 23, wherein determining the change from the first orientation to the second orientation comprises at least one of:
  determining a first change in a distance from the projector to the projection surface; or
  determining a second change in an angle between the projector and the projection surface.

* * * * *